(12) United States Patent
Sugi et al.

(10) Patent No.: US 9,190,880 B2
(45) Date of Patent: Nov. 17, 2015

(54) SPINDLE MOTOR, AND DISK DRIVE APPARATUS INCLUDING THE SPINDLE MOTOR

(71) Applicant: Nidec Corporation, Kyoto (JP)

(72) Inventors: Takatoki Sugi, Kyoto (JP); Tomohiro Yoneda, Kyoto (JP); Hiroshi Kobayashi, Kyoto (JP); Masanobu Taki, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/690,599

(22) Filed: Apr. 20, 2015

(65) Prior Publication Data

US 2015/0228300 A1 Aug. 13, 2015

Related U.S. Application Data

(60) Continuation-in-part of application No. 13/947,139, filed on Jul. 22, 2013, now Pat. No. 9,047,925, which is a division of application No. 13/334,620, filed on Dec. 22, 2011, now Pat. No. 8,593,756.

(30) Foreign Application Priority Data

Dec. 27, 2010 (JP) .................................. 2010-289546
Nov. 2, 2011 (JP) .................................. 2011-240741

(51) Int. Cl.
*H02K 5/167* (2006.01)
*G11B 33/14* (2006.01)
(Continued)

(52) U.S. Cl.
CPC .............. *H02K 5/1672* (2013.01); *F16C 33/74* (2013.01); *F16C 35/02* (2013.01);
(Continued)

(58) Field of Classification Search
CPC . B29C 65/00; Y10T 156/1798; Y10T 156/12; Y10T 156/10; G11B 19/2009; G11B 19/2036; F16C 2370/12; F16C 17/107; F16C 33/107
USPC ........... 310/90, 261.1, 262; 360/98.07, 99.04, 360/99.08; 384/322
See application file for complete search history.

(56) References Cited

U.S. PATENT DOCUMENTS 6,252,322 B1 6/2001 Kawawada et al.
6,404,087 B1 6/2002 Ichiyama
(Continued)

FOREIGN PATENT DOCUMENTS

JP 7-79550 A 3/1995
JP 8-126243 A 5/1996
(Continued)

OTHER PUBLICATIONS

Sugi et al., "Spindle Motor, and Disk Drive Apparatus Including the Spindle Motor", U.S. Appl. No. 13/947,139, filed Jul. 22, 2013.

*Primary Examiner* — Adam B Dravininkas
(74) *Attorney, Agent, or Firm* — Keating & Bennett, LLP

(57) ABSTRACT

A spindle motor includes a base portion and a bearing mechanism. A fixing region, which includes a first region at which the base portion and the bearing mechanism are fixed to each other and a second region at which a seal gap is defined between the base portion and the bearing mechanism, is located between an inner circumferential portion of the base portion which defines a through hole and an outer circumferential portion of the bearing mechanism. The inner circumferential portion of the base portion has, at least in the second region, a degree of surface roughness greater than a degree of surface roughness of the outer circumferential portion of the bearing mechanism. The seal gap gradually decreases in radial width with increasing height, and includes an adhesive along an entire circumference of the seal gap.

24 Claims, 30 Drawing Sheets

(51) Int. Cl.
*F16C 33/74* (2006.01)
*F16C 35/02* (2006.01)
*G11B 33/08* (2006.01)
*G11B 19/20* (2006.01)
*H02K 5/04* (2006.01)
*H02K 5/16* (2006.01)
*H02K 15/14* (2006.01)
*F16C 17/10* (2006.01)

(52) U.S. Cl.
CPC ....... *G11B 19/2009* (2013.01); *G11B 19/2036* (2013.01); *G11B 33/08* (2013.01); *G11B 33/1486* (2013.01); *H02K 5/04* (2013.01); *H02K 5/16* (2013.01); *H02K 5/1677* (2013.01); *H02K 15/14* (2013.01); *F16C 17/105* (2013.01); *F16C 33/743* (2013.01); *F16C 2226/12* (2013.01); *F16C 2226/40* (2013.01); *F16C 2370/12* (2013.01)

(56) References Cited

U.S. PATENT DOCUMENTS

| | | | |
|---|---|---|---|
| 7,088,023 B1 * | 8/2006 | Gomyo et al. | 310/90 |
| 2002/0084704 A1 * | 7/2002 | Fukutani et al. | 310/67 R |
| 2009/0022439 A1 * | 1/2009 | Yamamoto et al. | 384/114 |
| 2010/0034494 A1 * | 2/2010 | Hori | 384/114 |
| 2010/0053807 A1 * | 3/2010 | LeBlanc et al. | 360/99.08 |
| 2010/0181875 A1 * | 7/2010 | Tamaoka et al. | 310/425 |

FOREIGN PATENT DOCUMENTS

| | | | |
|---|---|---|---|
| JP | 10-108407 A | | 4/1998 |
| JP | 11-273236 A | | 10/1999 |
| JP | 2003-18787 A | | 1/2003 |
| JP | 2008-8472 A | | 1/2008 |
| JP | 2008002650 A | * | 1/2008 |

* cited by examiner

A — A

SPINDLE MOTOR, AND DISK DRIVE APPARATUS INCLUDING THE SPINDLE MOTOR

BACKGROUND OF THE INVENTION

1. Field of the Invention

The present invention relates to a spindle motor and more specifically to a spindle motor for use in a disk drive apparatus.

2. Description of the Related Art

In recent years, in accordance with increased storage density of disks, there has been a demand for disk drive apparatuses, such as hard disk drives, to control rotation of the disks, movement of heads, and so on with high precision. In a known hard disk drive (HDD) disclosed in JP-A 2006-40423, a gas arranged in an interior of the HDD is a low-density gas, such as a helium gas or a hydrogen gas, and the HDD is thereby arranged to achieve a reduction in resistance of the gas against a disk, a head, and so on during rotation of a spindle motor. The reduction in the resistance of the gas against the disk, the head, and so on contributes to reducing vibration of the disk, the head, and so on, enabling highly precise data recording.

Bases of some spindle motors (hereinafter referred to simply as "motors") installed in HDDs are defined by portions of housings of the HDDs. In the case where the interior of the HDD is filled with a gas such as a helium gas or the like as described in JP-A 2006-40423, the helium gas, for example, which has extremely small molecules, tends to easily leak out of the interior of the HDD to an outside of the HDD. Therefore, in the case where a shaft is fixed in a through hole defined in the base, it is not easy to ensure sufficient sealing of a region in which the base and the shaft are fixed to each other.

SUMMARY OF THE INVENTION

According to a preferred embodiment of the present invention, a spindle motor for use in a disk drive apparatus and including a housing defining an interior space is provided. The spindle motor includes a bearing mechanism, a stationary portion, and a rotating portion. The bearing mechanism includes a shaft portion extending in an axial direction. The stationary portion includes a base portion defining a portion of the housing. The rotating portion is configured to rotate about a central axis with respect to the stationary portion through the bearing mechanism. The base portion includes a through hole in which the bearing mechanism is fitted. A fixing region is defined between an inner circumferential portion of the base portion which defines the through hole and an outer circumferential portion of the bearing mechanism. The fixing region includes a first region at which the inner circumferential portion of the base portion and the outer circumferential portion of the bearing mechanism are fixed to each other; and a second region located below the first region, and at which a seal gap is defined between the inner circumferential portion of the base portion and the outer circumferential portion of the bearing mechanism. The inner circumferential portion of the base portion has, at least in the second region, a degree of surface roughness greater than a degree of surface roughness of the outer circumferential portion of the bearing mechanism. The seal gap gradually decreases in radial width with increasing height, and includes an adhesive positioned over an entire circumferential extent of the seal gap.

According to the above preferred embodiment of the present invention, the adhesive is less likely to leak toward the base portion, which has a greater degree of surface roughness, than toward the bearing mechanism, which has a smaller degree of surface roughness, when additional adhesion is performed at the second region after the base portion and the bearing mechanism are fixed to each other at the first region. Accordingly, the second region is sealed with the adhesive to prevent a leakage of a gas inside the housing, while preventing the adhesive from spreading to a lower surface of the base portion.

According to another preferred embodiment of the present invention, a spindle motor for use in a disk drive apparatus and including a housing defining an interior space is provided. The spindle motor includes a bearing mechanism, a stationary portion, and a rotating portion. The bearing mechanism includes a shaft portion extending in an axial direction. The stationary portion includes a base portion defining a portion of the housing. The rotating portion is configured to rotate about a central axis with respect to the stationary portion through the bearing mechanism. The base portion includes a through hole in which the bearing mechanism is fitted. A fixing region is defined between an inner circumferential portion of the base portion which defines the through hole and an outer circumferential portion of the bearing mechanism. The fixing region includes a first region at which the inner circumferential portion of the base portion and the outer circumferential portion of the bearing mechanism are fixed to each other; and a second region located below the first region, and at which a seal gap is defined between the inner circumferential portion of the base portion and the outer circumferential portion of the bearing mechanism. A recessed portion recessed radially inward at a lower axial end portion of the bearing mechanism or recessed radially outward from a lower axial end portion of a portion of the base portion which defines the through hole is provided. The recessed portion is joined to the seal gap, and extends all the way around the bearing mechanism. An adhesive is continuously arranged in the recessed portion and the seal gap. In the seal gap, the adhesive is located over an entire circumferential extent of the seal gap.

According to the above second preferred embodiment of the present invention, the adhesive is temporarily held in the recessed portion when additional adhesion is performed at the second region after the base portion and the bearing mechanism are fixed to each other at the first region. This prevents the adhesive from easily leaking out to a lower surface of the base portion when the additional adhesion is carried out. Accordingly, the second region is sealed with the adhesive to prevent a leakage of a gas inside the housing, while preventing the adhesive from spreading to the lower surface of the base portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
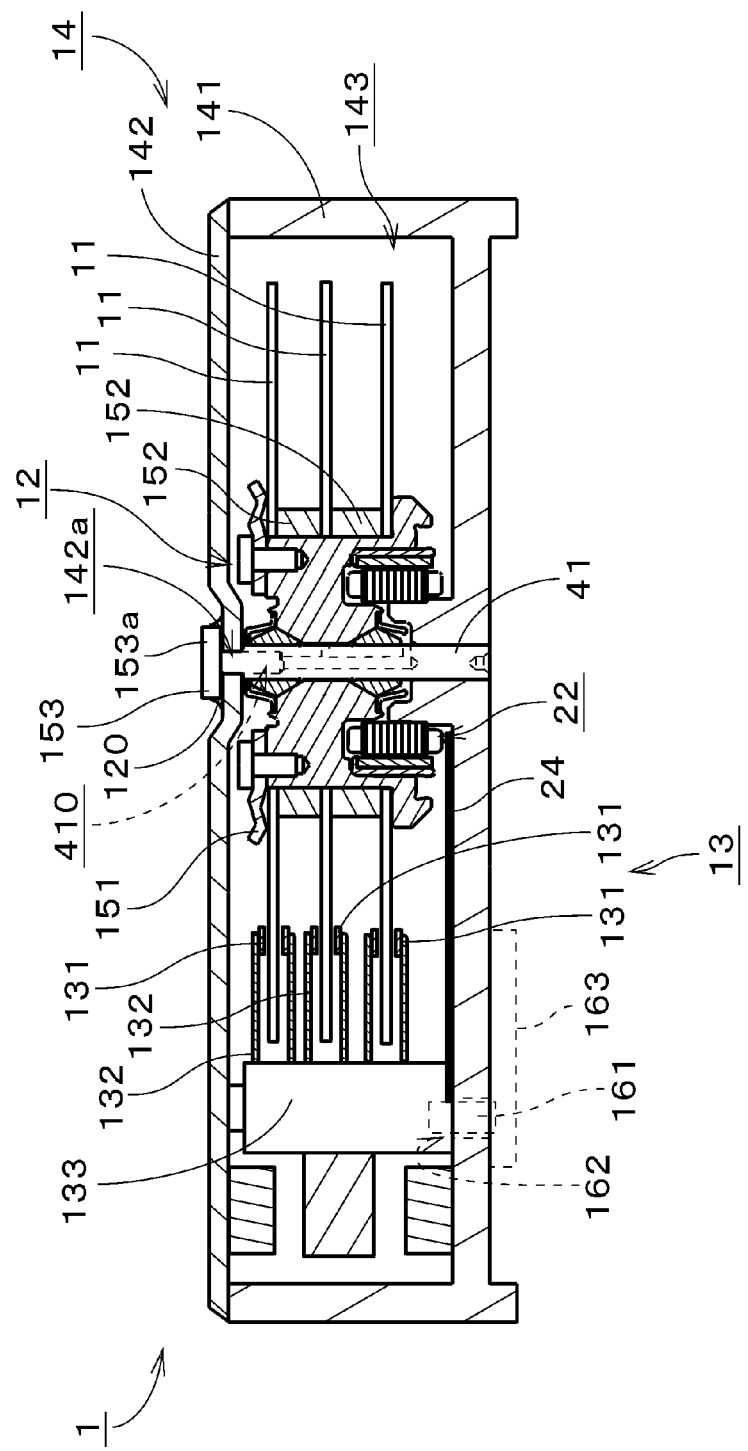
FIG. 1 is a diagram illustrating a disk drive apparatus according to a first preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel or substantially parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

FIG. 1 is a vertical cross-sectional view of a disk drive apparatus 1 including a spindle motor (hereinafter referred to simply as a "motor") 12 according to a first preferred embodiment of the present invention. The disk drive apparatus 1 is a so-called hard disk drive. The disk drive apparatus 1 preferably includes, for example, three disc-shaped disks 11, on which information is recorded, the motor 12, an access portion 13, a clamper 151, and a housing 14. The motor 12 is arranged to rotate while holding the disks 11. The access portion 13 is arranged to perform at least one of reading and writing of information from or to the disks 11. Note that the number of disks 11 may be other than three if so desired. Also note that the access portion 13 may be arranged to perform both the reading and the writing of information from or to the disks 11.

The housing 14 preferably includes a first housing member 141 and a second housing member 142, the second housing member 142 preferably having the shape of a flat plate. The disks 11, the motor 12, the access portion 13, and the clamper 151 are contained in the housing 14. The first housing member 141 and the second housing member 142 are preferably joined to each other through, for example, welding or by any other suitable methods to define the housing 14 of the disk drive apparatus 1. An interior space 143 of the housing 14 is hermetically enclosed, and includes no or substantially no dirt or dust. The interior space 143 of the housing 14 is preferably filled with a low-density gas, such as, for example, helium gas.

The three disks 11 are preferably arranged at substantially regular intervals in an axial direction through spacers 152, and configured to be clamped by the clamper 151 and the motor 12. The access portion 13 preferably includes six heads 131, six arms 132, and a head actuator mechanism 133. Each of the arms 132 is arranged to support a separate one of the heads 131. Each of the heads 131 is arranged to magnetically read and/or write information from or to a corresponding one of the disks 11 while being arranged in close proximity to the disk 11. The head actuator mechanism 133 is arranged to actuate each of the arms 132 to move an associated one of the heads 131 relative to a corresponding one of the disks 11. The head 131 is thereby arranged to access a desired location on the rotating disk 11 while being arranged in close proximity to the disk 11, to carry out the reading and/or writing of the information.

Figure 2:
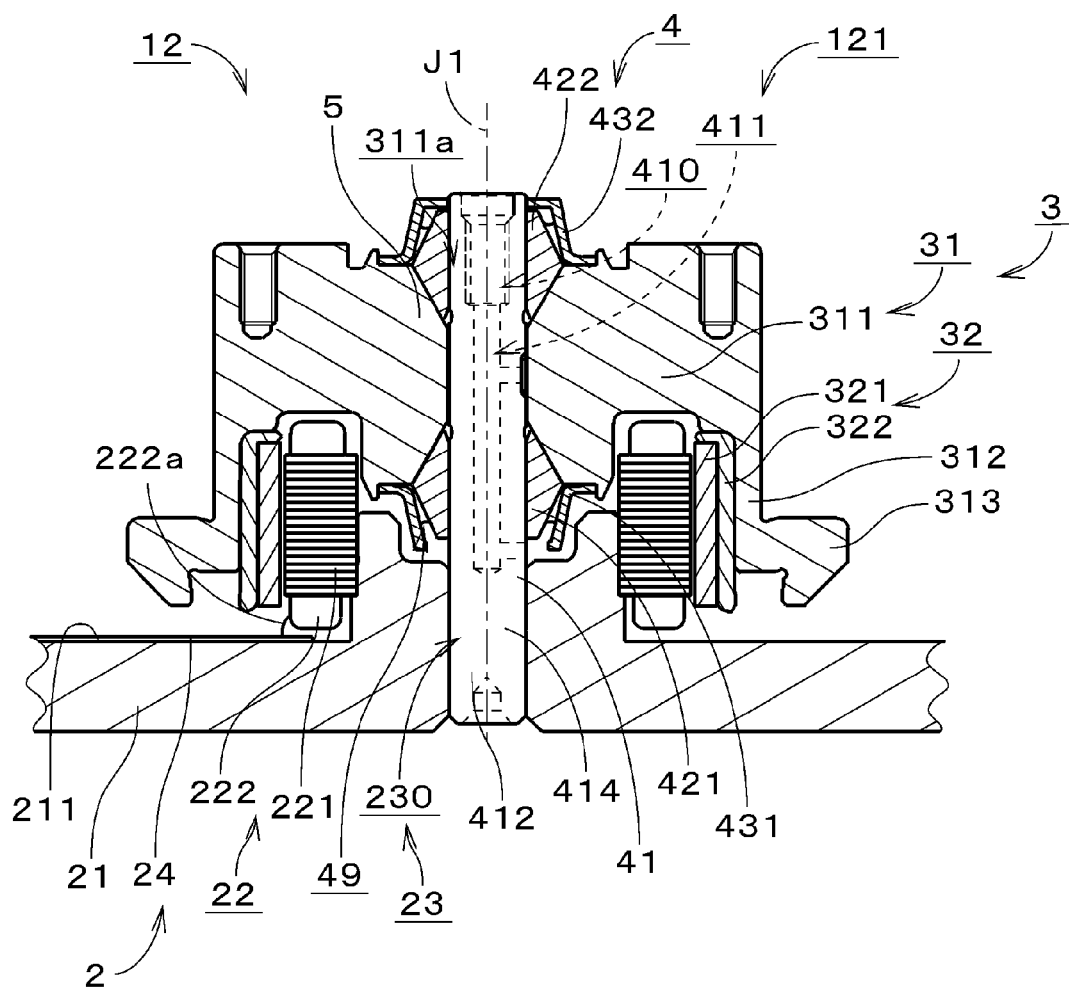
FIG. 2 is a diagram illustrating a motor according to the first preferred embodiment of the present invention.

FIG. 2 is a vertical cross-sectional view of the motor 12. The motor 12 is preferably an outer-rotor motor. The motor 12 includes a stationary portion 2, a rotating portion 3, and a fluid dynamic bearing mechanism 4. The fluid dynamic bearing mechanism 4 will be hereinafter referred to as a "bearing mechanism 4". The rotating portion 3 is supported through the bearing mechanism 4 to be rotatable about a central axis J1 of the motor 12 with respect to the stationary portion 2. The central axis J1 of the motor 12 preferably coincides with a central axis of each of the stationary portion 2, the rotating portion 3, and the bearing mechanism 4.

The stationary portion 2 preferably includes a base plate 21, which is an example of a base portion, a stator 22, and a wiring 24. The base plate 21 defines a portion of the first housing member 141 illustrated in FIG. 1. The base plate 21 includes a through hole 230 extending in the axial direction therethrough defined in a center thereof. The base plate 21 further includes one connector fitting hole 162 defined therein at a position away from the through hole 230, as represented by a broken line in FIG. 1. The connector fitting hole 162 is arranged to extend through the base plate 21. A connector 161 is arranged in the connector fitting hole 162. The connector fitting hole 162 is preferably arranged to be sealed by the connector 161 and by another method such as, for example, an application of an adhesive. The connector 161 is arranged to be connected to an external circuit 163 outside the housing 14.

Referring to FIG. 2, the stator 22 is preferably fixed to the base plate 21. The stator 22 includes a stator core 221 and coils 222 wound on the stator core 221. The wiring 24 is arranged to extend along an inner bottom surface 211 of the base plate 21. The inner bottom surface 211 is a surface that faces the interior space 143 of the housing 14 illustrated in FIG. 1. The wiring 24 is arranged to extend from the stator 22 to the connector 161, which is represented by a broken line in FIG. 1. One end portion of the wiring 24 is connected to the connector 161, while an opposite end portion thereof is connected to lead wires 222a leading from the coils 222 illustrated in FIG. 2. An example of a preferred form of the wiring 24 is a flexible printed circuit (FPC) board. However, the wiring 24 could also be defined by a wire or wires continuous with the lead wires 222a.

The rotating portion 3 preferably includes a rotor hub 31 and a magnetic member 32. The rotor hub 31 includes a hub body 311, a cylindrical portion 312, and a disk mount portion 313. The cylindrical portion 312 projects downward from an outer edge portion of the hub body 311. The disk mount portion 313 is arranged to extend radially outward from a bottom portion of the cylindrical portion 312. The magnetic member 32 preferably includes a substantially cylindrical rotor magnet 321 and a back iron 322. The rotor magnet 321 is preferably fixed to an inside of the cylindrical portion 312 with the back iron 322 being arranged therebetween. The rotor magnet 321 is positioned radially opposite the stator 22. A rotational torque is generated due to the interaction between the magnetic flux generated by the stator 22 and the rotor magnet 321.

The hub body 311 includes a central hole portion 311a extending in the axial direction and defined in a center thereof. A portion 5 of the hub body 311 which is in the vicinity of the central axis J1 and which includes the central hole portion 311a will be hereinafter referred to as a "sleeve portion 5".

The bearing mechanism 4 preferably includes a shaft 41, a first cone portion 421, a second cone portion 422, a first cover member 431, a second cover member 432, and a lubricating oil 49. The shaft 41 is inserted in the central hole portion 311a of the sleeve portion 5. A lower portion 412 of the shaft 41 is preferably fitted in the through hole 230 of the base plate 21. The lower portion 412 refers to a portion of the shaft 41 which is inserted in the through hole 230, and will be hereinafter referred to as a "shaft lower portion 412". A portion of the base plate 21 which is in the vicinity of the central axis J1 and which includes the through hole 230 will be hereinafter referred to as an "inner circumferential portion 23". The shaft 41 is arranged to extend in the vertical direction along the central axis J1. The shaft 41 includes a non-through hole portion 411 defined in an interior thereof. The hole portion 411 is arranged to extend downward from an upper axial end of the shaft 41 along the central axis J1. The hole portion 411 is arranged to have an axial length greater than the axial length of a non-through region 414. The non-through region 414 is defined on a lower side of the hole portion 411 and between the hole portion 411 and a small hole portion defined in a lower axial end portion of the shaft 41. An upper portion of the hole portion 411 includes a screw hole portion 410.

Referring to FIG. 1, a screw 153 is preferably inserted into the screw hole portion 410 and a hole portion 142a defined in a center of the second housing member 142, which is arranged to cover an upper side of the motor 12. The second housing member 142 and the shaft 41 are thereby fixed to each other. A sealant 120 is preferably arranged at all circumferential positions between an outer circumferential portion of the screw 153 and inner circumferential portions of both the screw hole portion 410 and the hole portion 142a, and at all circumferential positions between an upper portion of the hole portion 142a and a head portion 153a of the screw 153. An example of the sealant 120 is an adhesive.

Referring to FIG. 2, the first cone portion 421 is fixed to the shaft 41 on a lower side of the sleeve portion 5. An upper portion of an outside surface of the first cone portion 421 is angled radially outward with decreasing height, while a lower portion of the outside surface of the first cone portion 421 is preferably angled radially outward with increasing height. The second cone portion 422 is fixed to the shaft 41 on an upper side of the sleeve portion 5. As with the first cone portion 421, an upper portion of an outside surface of the second cone portion 422 is preferably angled radially outward with decreasing height, while a lower portion of the outside surface of the second cone portion 422 is angled radially outward with increasing height.

Figure 3:
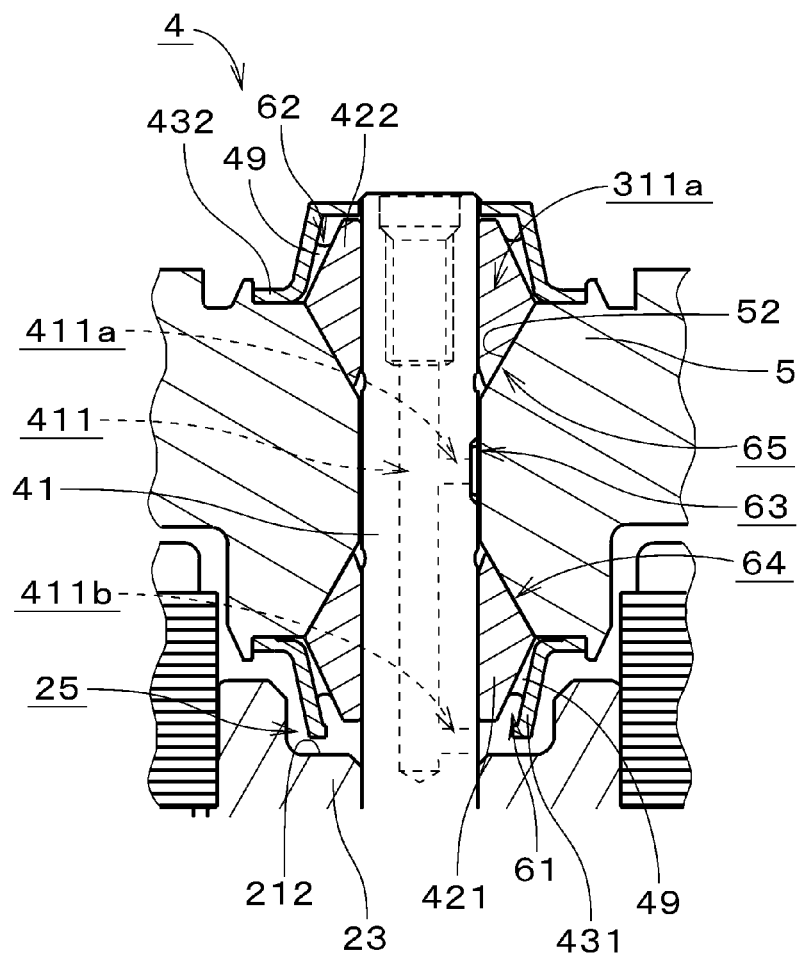
FIG. 3 is a diagram illustrating a bearing mechanism according to the first preferred embodiment of the present invention.

FIG. 3 is a diagram illustrating the bearing mechanism 4 in an enlarged form. A lower portion of an inside surface 52 of the central hole portion 311a of the sleeve portion 5 is angled radially outward with decreasing height, while an upper portion of the inside surface 52 is angled radially outward with increasing height.

A first inclined gap 64, which is preferably angled radially outward with decreasing height, is defined between the lower portion of the inside surface 52 of the sleeve portion 5 and the upper portion of the outside surface of the first cone portion 421. A second inclined gap 65, which is preferably angled radially outward with increasing height, is defined between the upper portion of the inside surface 52 of the sleeve portion 5 and the lower portion of the outside surface of the second cone portion 422.

The first cover member 431 is attached to a bottom portion of the sleeve portion 5, and is arranged opposite to the outside surface of the first cone portion 421. The second cover member 432 is attached to a top portion of the sleeve portion 5, and is arranged to cover the outside surface and an upper axial end of the second cone portion 422.

The lubricating oil 49 is preferably arranged in two locations, namely, in the first inclined gap 64 and in the second inclined gap 65. Surfaces of the lubricating oil 49 arranged in the first inclined gap 64 are located in a gap 61 defined between the first cover member 431 and the first cone portion 421, and in a lower portion of a middle gap 63 defined between the shaft 41 and a middle portion of the sleeve portion 5. Surfaces of the lubricating oil 49 arranged in the second inclined gap 65 are located in a gap 62 defined between the second cover member 432 and the second cone portion 422, and in an upper portion of the middle gap 63.

The shaft 41 preferably includes a first communicating portion 411a and a second communicating portion 411b defined therein. The first communicating portion 411a is preferably a first connection channel arranged to establish radial communication between the hole portion 411, which is defined in the interior of the shaft 41, and the middle gap 63, which is arranged in an interior of the bearing mechanism 4. The second communicating portion 411b is preferably a second connection channel arranged to establish radial communication between the hole portion 411 and a space 25 defined on an upper side of an upper surface 212 of the inner circumferential portion 23, i.e., a space on a lower side of the bearing mechanism 4. An end opening of the second communicating portion 411b is arranged in the vicinity of the surface of the lubricating oil 49 located in the gap 61 defined between the first cover member 431 and the first cone portion 421. The middle gap 63 is in communication with the space 25 on the lower side of the bearing mechanism 4 through the first communicating portion 411a, the hole portion 411, and the second communicating portion 411b. Pressure in the middle gap 63 is thus equal to or substantially equal to pressure in the interior space 143 of the disk drive apparatus 1. As a result, balance between the upper and lower surfaces of the lubricating oil 49 held in the first inclined gap 64 is maintained in a substantially constant state. Similarly, balance between the upper and lower surfaces of the lubricating oil 49 held in the second inclined gap 65 is also maintained in a substantially constant state.

While the motor 12 is driven, a fluid dynamic pressure is generated through the lubricating oil 49 in each of the first inclined gap 64 and the second inclined gap 65. The sleeve portion 5 is thereby supported to be rotatable with respect to the shaft 41. In the motor 12, the sleeve portion 5 defines a portion of the bearing mechanism 4 as a portion supported by the shaft 41. That is, the sleeve portion 5 is a portion of the rotating portion 3 and a portion of the bearing mechanism 4 at the same time.

In the motor 12, the axial length of the hole portion 411 is greater than the axial length of the non-through region 414 makes it possible to arrange the second communicating portion 411b in a lower portion of the bearing mechanism 4, and also to arrange the first cone portion 421 in the lower portion of the bearing mechanism 4. As a result, bearing portions which are defined in the first inclined gap 64 and the second inclined gap 65 and each of which is arranged to generate a fluid dynamic pressure in the lubricating oil 49 can be arranged at a sufficient axial distance from each other to achieve an improvement in bearing rigidity of the bearing mechanism 4.

Figure 4:
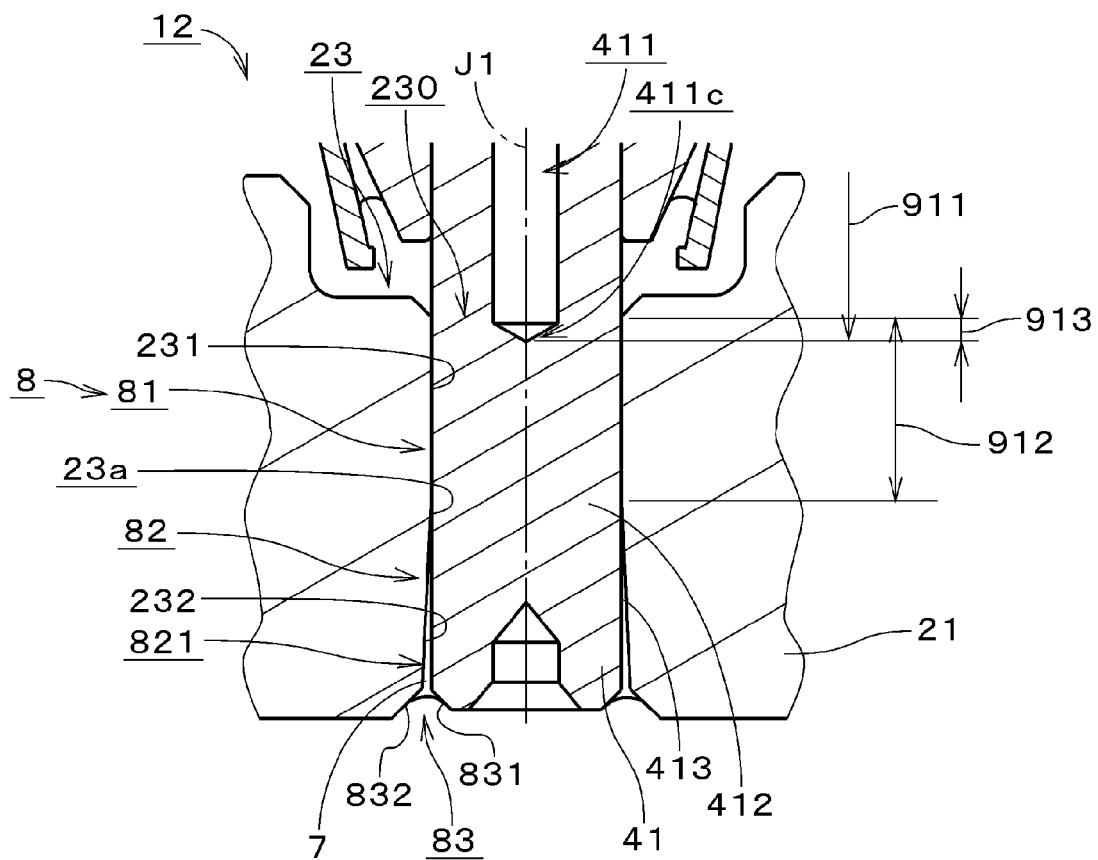
FIG. 4 is a diagram illustrating a lower portion of a shaft and its vicinity according to the first preferred embodiment of the present invention.

FIG. 4 is a diagram illustrating the shaft lower portion 412 of the motor 12 and its vicinity in an enlarged form. An outer circumferential surface 413 of the shaft lower portion 412, which is a portion of the shaft 41 which is inserted in the through hole 230, is a cylindrical surface centered on the central axis J1. Hereinafter, the outer circumferential surface 413 will be referred to as an "inserted outer circumferential surface 413". An upper portion 231 of an inner circumferential surface 23a of the inner circumferential portion 23 includes a cylindrical surface centered on the central axis J1. Hereinafter, the upper portion 231 will be referred to as an "inner circumferential surface upper portion 231". A lower portion 232 of the inner circumferential surface 23a includes an angled surface which is arranged to gradually decrease in diameter with increasing height. Hereinafter, the lower portion 232 will be referred to as an "inner circumferential surface lower portion 232".

An upper portion of the inserted outer circumferential surface 413 is press fitted in the inner circumferential surface upper portion 231. Hereinafter, a region defined between the upper portion of the inserted outer circumferential surface 413 and the inner circumferential surface upper portion 231 will be referred to as a "press-fitting region 81". Regarding the shaft 41, a lower axial end 411c of the hole portion 411, which is defined in the interior of the shaft 41, is located at a level slightly lower than that of an upper axial end of the press-fitting region 81. The hole portion 411 is thus arranged to overlap in a radial direction with the press-fitting region 81. To be more accurate, an axial extension range 911 of the hole portion 411 and an axial extension range 912 of the press-fitting region 81 are arranged to overlap with each other. In the motor 12, the axial length of a range 913 over which the two axial extension ranges 911 and 912 overlap with each other is preferably about half or less than about half the axial length of the press-fitting region 81, for example. As a result, in the present preferred embodiment, a sufficient strength of the press fit of the shaft 41 to the base plate 21 is achieved as opposed to the case where the entire press-fitting region 81 is arranged to overlap with the axial extension range 912 of the hole portion.

A seal gap 821 is defined between a lower portion of the inserted outer circumferential surface 413 and the inner circumferential surface lower portion 232. The seal gap 821 is arranged to gradually decrease in radial width with increasing height. An adhesive 7 is preferably arranged in the seal gap 821 over an entire circumference thereof, so that the shaft lower portion 412 is adhered to the inner circumferential portion 23. The adhesive 7 is preferably an epoxy thermosetting adhesive. Hereinafter, a substantially cylindrical region in which the seal gap 821 is defined will be referred to as an "adhesion region 82". Note that the adhesive 7 may be arranged in the press-fitting region 81 as well. As described above, the shaft 41 is preferably fixed to the inner circumferential portion 23 through both press fit and adhesion. Hereinafter, an entire region including the press-fitting region 81, which is defined between the inner circumferential portion 23 and the shaft lower portion 412, and the adhesion region 82, which is defined on a lower side of the press-fitting region 81, will be referred to as a "fixing region 8".

Figure 5:
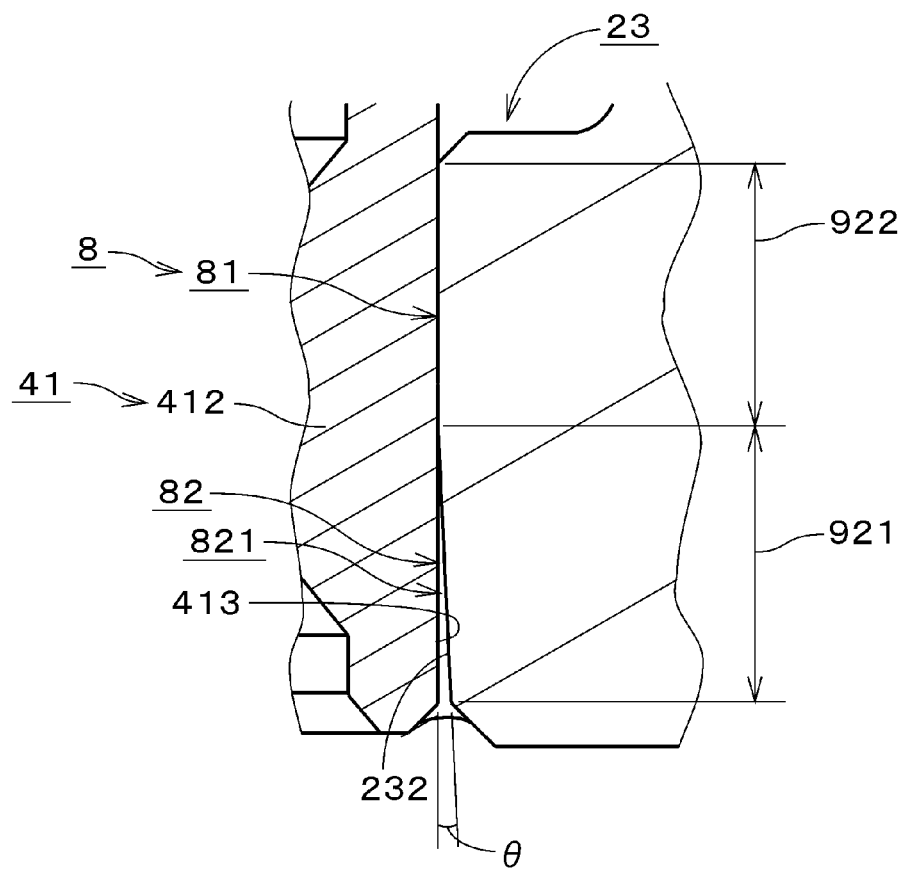
FIG. 5 is a diagram illustrating the lower portion of the shaft and its vicinity according to the first preferred embodiment of the present invention.

Referring to FIG. 5, the axial length 921 of the adhesion region 82 and the axial length 922 of the press-fitting region 81 within the fixing region 8 are preferably equal or substantially equal to each other. An angle θ defined between the inner circumferential surface lower portion 232 and the inserted outer circumferential surface 413 of the shaft lower portion 412 in a cross-section of the inner circumferential portion 23 and the shaft 41 taken on a plane including the central axis J1, i.e., an angle of the seal gap 821, is preferably in the range of about 3 degrees to about 4 degrees. Referring to FIG. 4, on a lower side of the adhesion region 82, an annular chamfer portion 83 is preferably defined by a chamfer 831 defined in a lower axial end portion of the inserted outer circumferential surface 413 and a chamfer 832 defined in a lower axial end portion of the inner circumferential surface 23a. The annular chamfer portion 83 is arranged to gradually increase in radial width with decreasing height.

In the motor 12, the adhesive 7 is preferably arranged in the seal gap 821 over the entire circumference thereof to seal a gap defined between the shaft 41 and the inner circumferential portion 23. This contributes to preventing the gas arranged in the interior of the housing 14 from leaking out through the gap defined between the shaft 41 and the inner circumferential portion 23.

Figure 6:
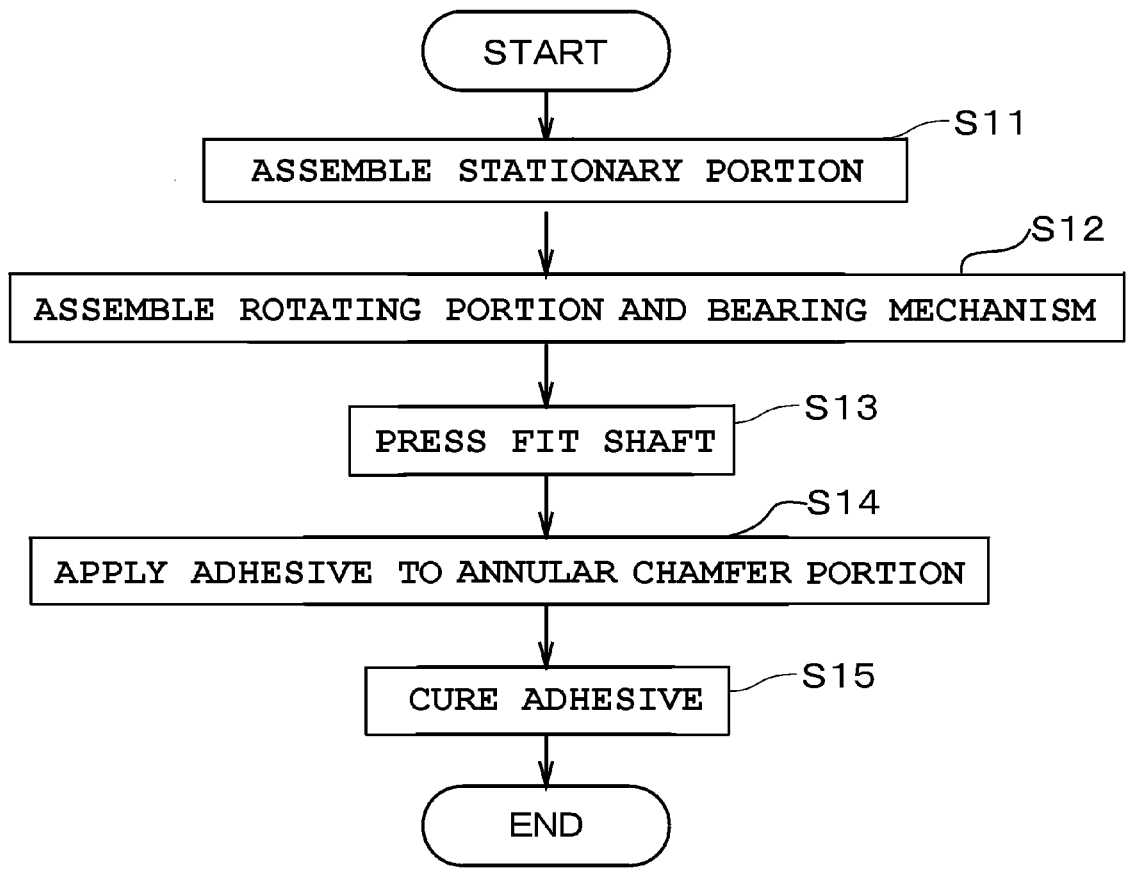
FIG. 6 is a flowchart illustrating a procedure of assembling the motor according to the first preferred embodiment of the present invention.

FIG. 6 is a flowchart illustrating a procedure of assembling the motor 12. First, the stationary portion 2 illustrated in FIG. 2 is assembled, and the rotating portion 3 and the bearing mechanism 4 are assembled as a single assembly 121 (steps S11 and S12). Note that the stationary portion 2 may be assembled after or simultaneously with the assembly of the assembly 121. The same holds true for other preferred embodiments of the present invention described below.

Figure 7:
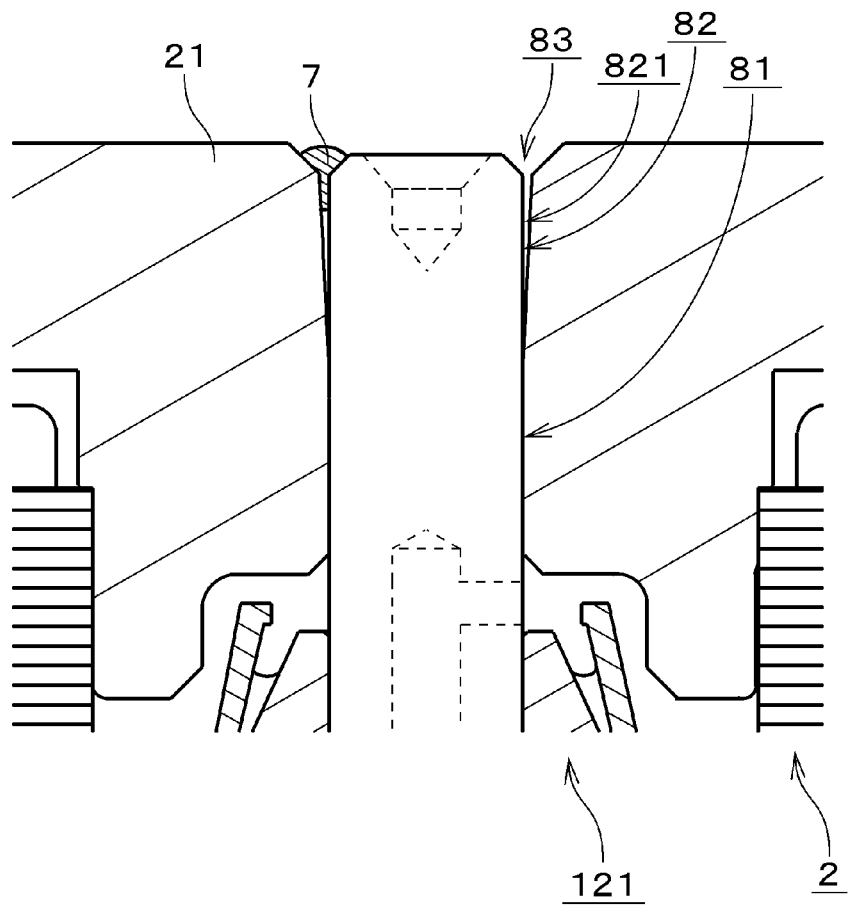
FIG. 7 is a diagram illustrating the lower portion of the shaft and its vicinity according to the first preferred embodiment of the present invention.

Next, referring to FIG. 4, the shaft lower portion 412 is press fitted into the through hole 230 of the inner circumferential portion 23 (step S13). As a result, the shaft 41 is temporarily fixed to the base plate 21 in the fixing region 8. Referring to FIG. 7, the assembly 121 and the stationary portion 2 are turned upside down, and the adhesive 7, which is now in a liquid state, is applied preferably to a single location in the annular chamfer portion 83 (step S14). The adhesive 7 then enters into the seal gap 821, traveling downward in FIG. 7, i.e., in the direction of the press-fitting region 81, and preferably spreads evenly in a circumferential direction in the seal gap 821. At this time, air inside the seal gap 821 travels to an outside of the base plate 21 through a portion of the annular chamfer portion 83 where the adhesive 7 is not applied. That is, the air is replaced by the adhesive 7 as a result of the spread of the adhesive 7 in the seal gap 821 and the accompanying travel of the air inside the seal gap 821 to the outside of the base plate 21. A sufficient spreading of the adhesive 7 throughout the seal gap 821 is achieved by capillary action to thereby permit little or no air to remain in the seal gap 821. Air remaining in the seal gap results in a decrease in the area (including the axial length) of the adhesion region, which may lead to an increased likelihood of a gas passing through the adhesion region. In the present preferred embodiment, the air is replaced by the adhesive 7 in the seal gap 821 according to the above-described mechanism, to secure a sufficient area of the adhesion region 82.

After the spreading of the adhesive 7 throughout the entire seal gap 821 is complete, the stationary portion 2 and the assembly 121 are carried into a heating device, and the adhesive 7 is heated and cured (step S15). As a result, the assembly 121 and the base plate 21 are securely fixed to each other to complete an operation of assembling the motor 12. During the assembly of the motor 12, the shaft 41 is temporarily fixed to the base plate 21, and this eliminates a need to use a large-scale jig to fix relative positions of the stationary portion and the assembly in the heating device as would be required if the shaft and the base plate were to be fixed to each other through only the adhesive. This in turn facilitates the operation of assembling the motor 12.

The structure of the motor 12 and the operation of assembling the motor 12 according to the first preferred embodiment have been described above. In the disk drive apparatus 1 including the motor 12, the adhesive 7 is arranged in the seal gap 821 over the entire circumference thereof, and this contributes to preventing the internal gas from leaking out through the gap defined between the shaft 41 and the inner circumferential portion 23. The technique of sealing the seal gap 821 with the adhesive 7 is particularly suitable for a case where the internal gas is a helium gas. Even if the base plate 21 of the disk drive apparatus 1 needs to have a small thickness in order to enable a large number of disks 11 to be mounted in the disk drive apparatus 1 while reducing the height of the disk drive apparatus 1, adoption of the above-described technique makes it possible to seal the gap defined between the shaft 41 and the base plate 21.

The seal gap 821 is arranged to have a so-called tapered shape, gradually decreasing in radial width with increasing height. This contributes to causing the adhesive 7 to spread into the seal gap 821. This contributes to preventing air from remaining in the seal gap 821. As a result, an improvement in reliability of the disk drive apparatus 1 is achieved.

The hole portion 411 defined in the interior of the shaft 41 does not extend through the shaft 41 in the axial direction. This contributes to preventing the internal gas from passing through the hole portion 411 and leaking out downwardly of the base plate 21.

The sealant 120 is located at all circumferential positions between the upper portion of the hole portion 142a of the second housing member 142 and the head portion 153a of the screw 153. This contributes to preventing the gas arranged inside the disk drive apparatus 1 from leaking out through a slight gap defined between the second housing member 142 and the head portion 153a of the screw 153. Moreover, the sealant 120 is also arranged at all circumferential positions between the outer circumferential portion of the screw 153 and the inner circumferential portions of both the screw hole portion 410 and the hole portion 142a. This contributes to more securely preventing a leakage of the gas.

Figure 8:
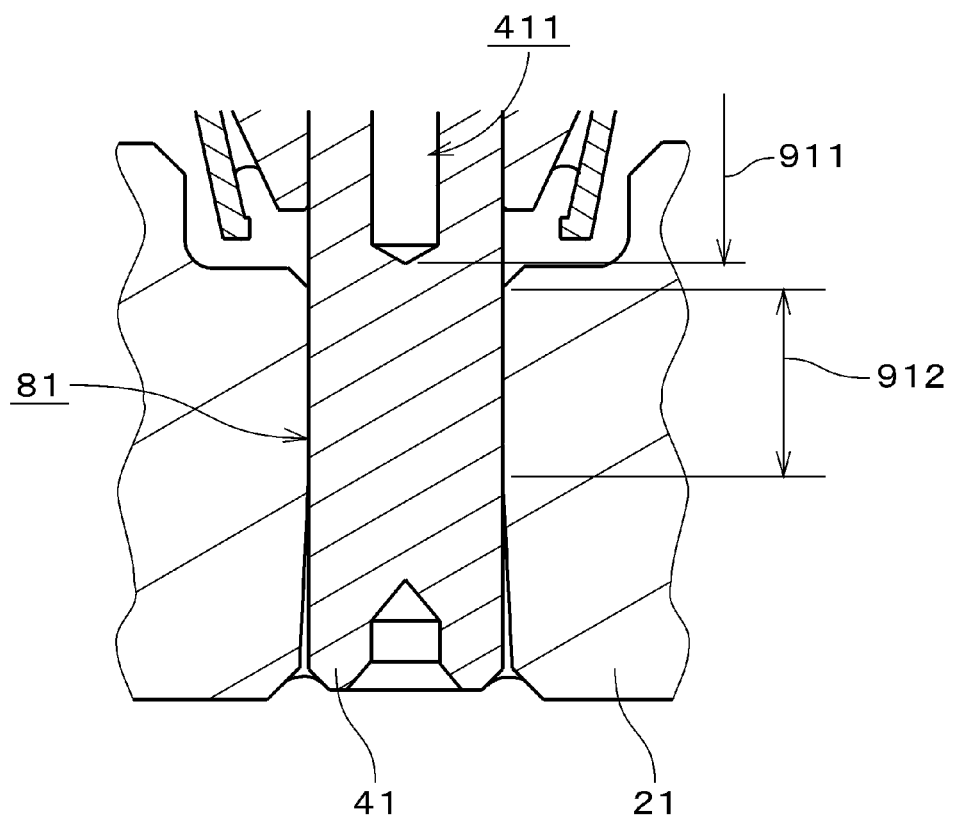
FIG. 8 is a diagram illustrating a portion of a motor according to a modification of the first preferred embodiment of the present invention.

Referring to FIG. 8, in a motor 12 according to a modification of the first preferred embodiment, the axial extension range 911 of the hole portion 411 and the axial extension range 912 of the press-fitting region 81 may be arranged not to overlap with each other. In this case, an increase in the strength of the press fit of the shaft 41 to the base plate 21 is achieved.

The axial length 921 of the adhesion region 82 and the axial length 922 of the press-fitting region 81 within the fixing region 8 are equal or substantially equal to each other. This enables a sufficient amount of the adhesive 7 to be arranged between the shaft 41 and the inner circumferential portion 23 to achieve the sealing. The axial length of the adhesion region 82 is preferably in the range between about half the axial length of the press-fitting region 81 and about twice the axial length of the press-fitting region 81. The sealing of the gap defined between the shaft 41 and the base plate 21 with the adhesive 7 is thereby achieved. The same holds true for other preferred embodiments of the present invention described below.

In the motor 12, the angle of the seal gap 821 is preferably in the range of about 3 degrees to about 4 degrees to retain the adhesive 7 therein, for example. A leakage of the gas arranged inside the disk drive apparatus 1 can be thereby prevented. The angle of the seal gap 821 is preferably more than about 0.1 degrees, for example, in order to allow a sufficient amount of the adhesive 7 to be held in the seal gap 821. In addition, the angle of the seal gap 821 is preferably less than about 10 degrees, for example, in order to securely prevent the internal gas from penetrating through the adhesive 7 and leaking out of the base plate 21. The angle of the seal gap 821 is more preferably in the range of about 0.2 degrees to about 4 degrees, and still more preferably in the range of about 3 degrees to about 4 degrees, for example.

Note that a hydrogen gas, instead of the helium gas, may also be used as the gas fed into the interior of the housing 14 of the disk drive apparatus 1. Also note that a mixture of the helium gas and the hydrogen gas may be used as the gas fed into the interior of the housing 14 if desired. Also note that a mixture of air and any one of the helium gas, the hydrogen gas, and the mixture of the helium gas and the hydrogen gas may be used as the gas fed into the interior of the housing 14. The same holds true for other preferred embodiments of the present invention described below.

The adhesive 7 used in the motor 12 is preferably a thermosetting adhesive, for example. In this case, the adhesive 7 is able to fix the shaft 41 and the base plate 21 to each other with a greater joint strength than in the case where the adhesive 7 possesses only an anaerobic property or only a UV-curing property. A variety of adhesives that possess the anaerobic property and/or the UV-curing property may be used in the motor 12, as long as the adhesives possess a thermosetting property. The same holds true for other preferred embodiments of the present invention described below.

Figure 9:
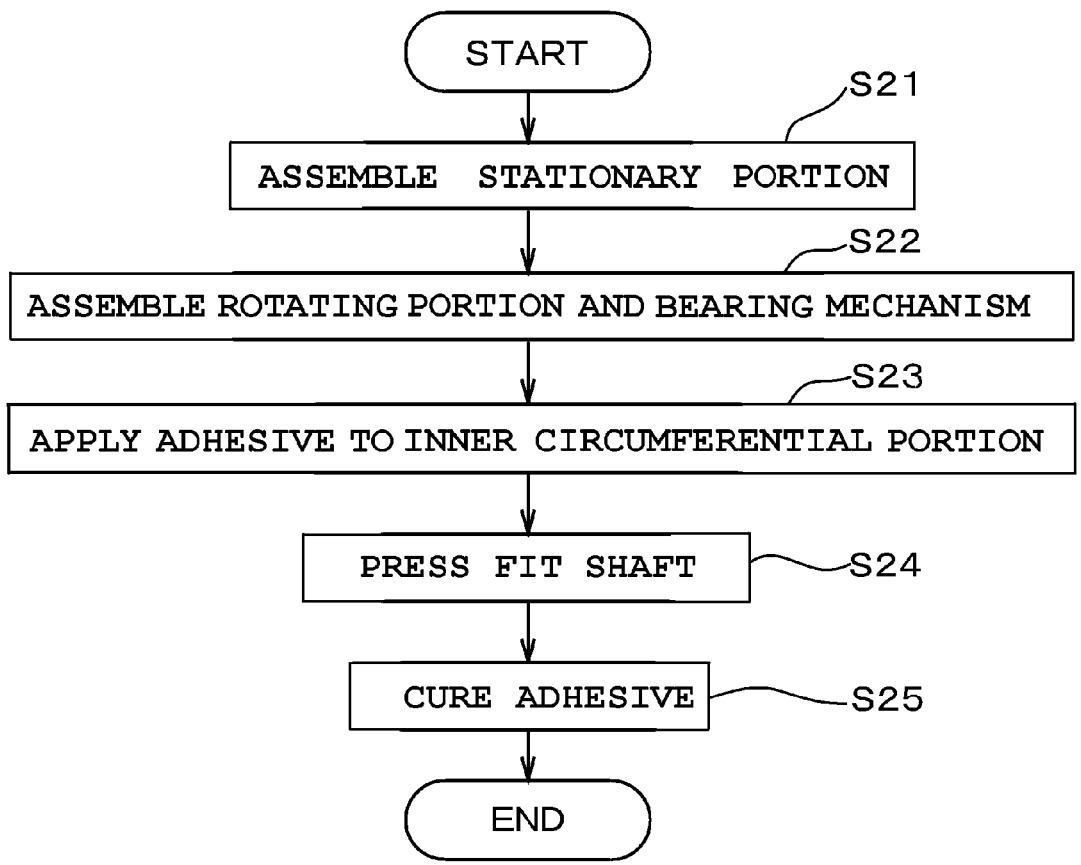
FIG. 9 is a flowchart illustrating a procedure of assembling the motor according to a modification of the first preferred embodiment of the present invention.
Figure 10:
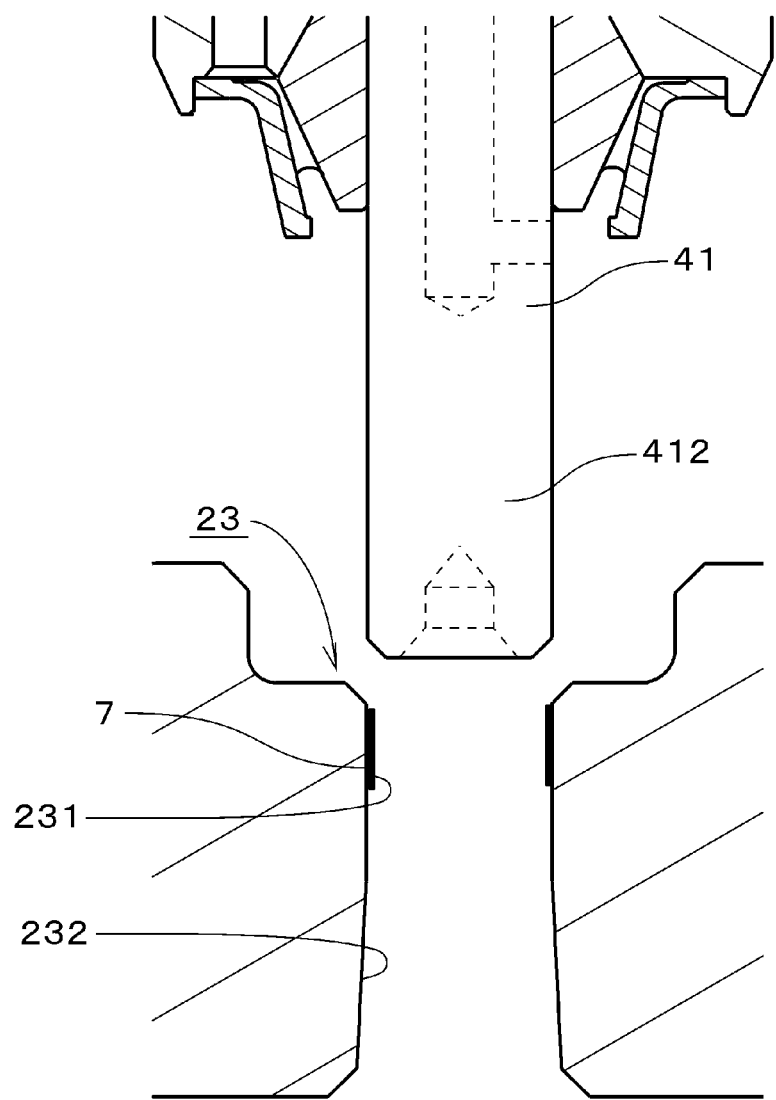
FIG. 10 is a diagram illustrating the motor in the course of assembling thereof according to a modification of the first preferred embodiment of the present invention.

Next, a procedure of assembling the motor 12 according to a modification of the first preferred embodiment will now be described below with reference to FIG. 9. First, as in the above-described operation of assembling the motor 12, the stationary portion 2 as illustrated in FIG. 2 is assembled, and the rotating portion 3 and the bearing mechanism 4 are assembled as the single assembly 121 (steps S21 and S22). Next, referring to FIG. 10, the adhesive 7, which is now in the liquid state, is applied to all circumferential positions on the inner circumferential surface upper portion 231 of the inner circumferential portion 23 (step S23). The shaft 41 is inserted from above into the inner circumferential portion 23, so that the shaft lower portion 412 is press fitted to the inner circumferential surface upper portion 231 (step S24).

At this time, the adhesive 7 is spread to the inner circumferential surface lower portion 232 in accordance with movement of the shaft 41. The adhesive 7 is held in the seal gap 821 over the entire circumference thereof as illustrated FIG. 4. In the motor 12, the adhesive 7 also serves as a lubricant to facilitate the insertion of the shaft 41. The base plate 21 is thereafter heated, and the adhesive 7 is cured (step S25) to complete the operation of assembling the motor 12.

In the motor 12, the adhesive 7 is arranged in the seal gap 821 over the entire circumference thereof. This contributes to preventing the gas arranged inside the disk drive apparatus 1 from leaking out through the gap defined between the shaft 41 and the inner circumferential portion 23. The adhesive 7 is held in the entire seal gap 821 through capillary action, so that air is prevented from remaining in the seal gap 821. Note that in the assembly of the motor 12, the adhesive 7, which is then in the liquid state, may be applied to both the inserted outer circumferential surface 413 of the shaft lower portion 412 and the inner circumferential surface upper portion 231.

Figure 11:
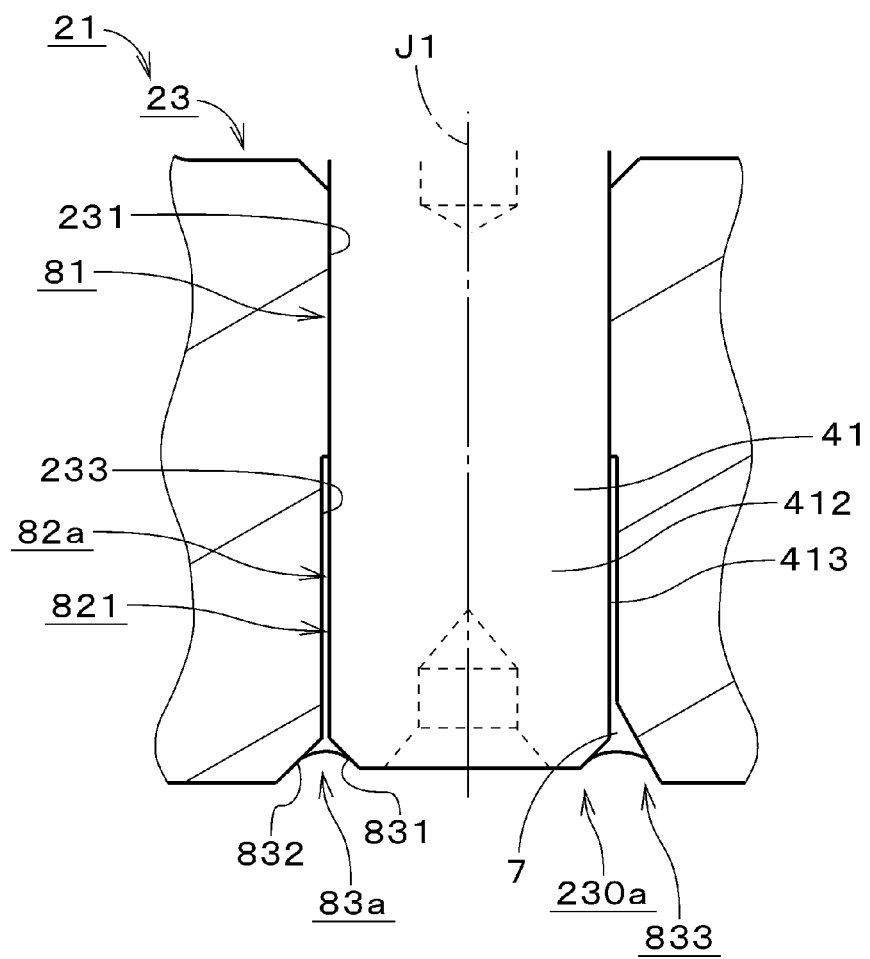
FIG. 11 is a diagram illustrating a lower portion of a shaft of a motor and its vicinity according to a second preferred embodiment of the present invention.
Figure 12:
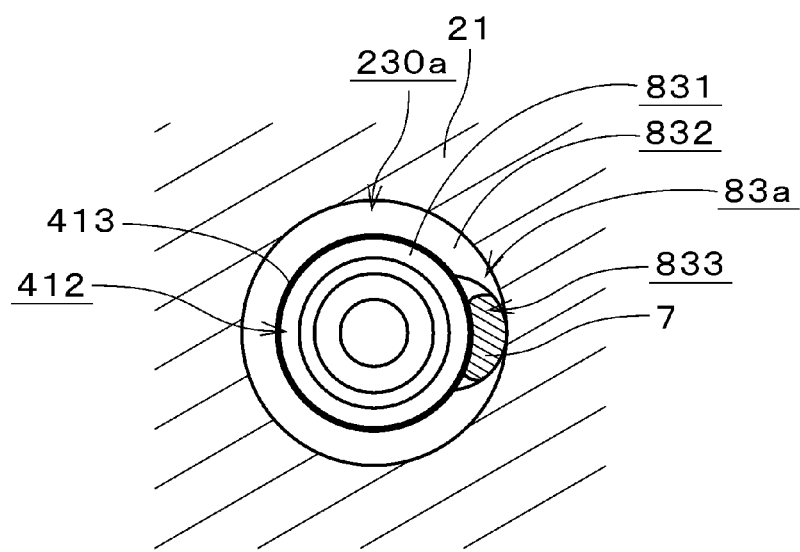
FIG. 12 is a bottom view of the shaft and a base plate according to the second preferred embodiment of the present invention.

FIG. 11 is a diagram illustrating a shaft lower portion 412 of a motor according to a second preferred embodiment of the present invention and its vicinity in an enlarged form. An inner circumferential portion 23 of a base plate 21 preferably includes an inner circumferential surface upper portion 231 and a portion 233 defined on a lower side of the inner circumferential surface upper portion 231 and which is defined by a cylindrical surface having a diameter slightly greater than that of the inner circumferential surface upper portion 231. Hereinafter, the portion 233 will be referred to as an "inner circumferential surface lower portion 233". In FIG. 11, the greater diameter of the inner circumferential surface lower portion 233 is emphasized. The same holds true for FIGS. 14 and 16 referenced below. FIG. 12 is a bottom view of the base plate 21 and the shaft lower portion 412. In FIG. 12, a lower surface of the base plate 21 and an adhesive 7 are indicated by parallel oblique lines. As illustrated in FIGS. 11 and 12, a recessed portion 833 which is recessed upward is defined in a portion of a lower axial end portion 230*a* of an inner circumferential surface 23*a* of the inner circumferential portion 23. The lower axial end portion 230*a* includes a chamfer 832 defined therein except at the recessed portion 833.

In the motor according to the second preferred embodiment, the recessed portion 833, the chamfer 832, and a chamfer 831 defined in a lower axial end portion of an inserted outer circumferential surface 413 of the shaft lower portion 412 are arranged to together define an annular chamfer portion 83*a* which is recessed upward as with the annular chamfer portion 83*a* according to the first preferred embodiment. The motor according to the second preferred embodiment is otherwise preferably similar in structure to the motor 12 according to the first preferred embodiment. Accordingly, like members or portions are designated by like reference numerals, and redundant description is omitted.

Referring to FIG. 11, a seal gap 821 extending parallel or substantially parallel to a central axis J1 is defined in an adhesion region 82*a* defined between the inner circumferential surface lower portion 233 and the inserted outer circumferential surface 413. The seal gap 821 is in connection with the recessed portion 833. The adhesive 7 is arranged to extend continuously in the recessed portion 833 and the seal gap 821. In the seal gap 821, the adhesive 7 is arranged over an entire circumference thereof. As a result, a gap defined between a shaft 41 and the inner circumferential portion 23 is sealed.

Figure 13:
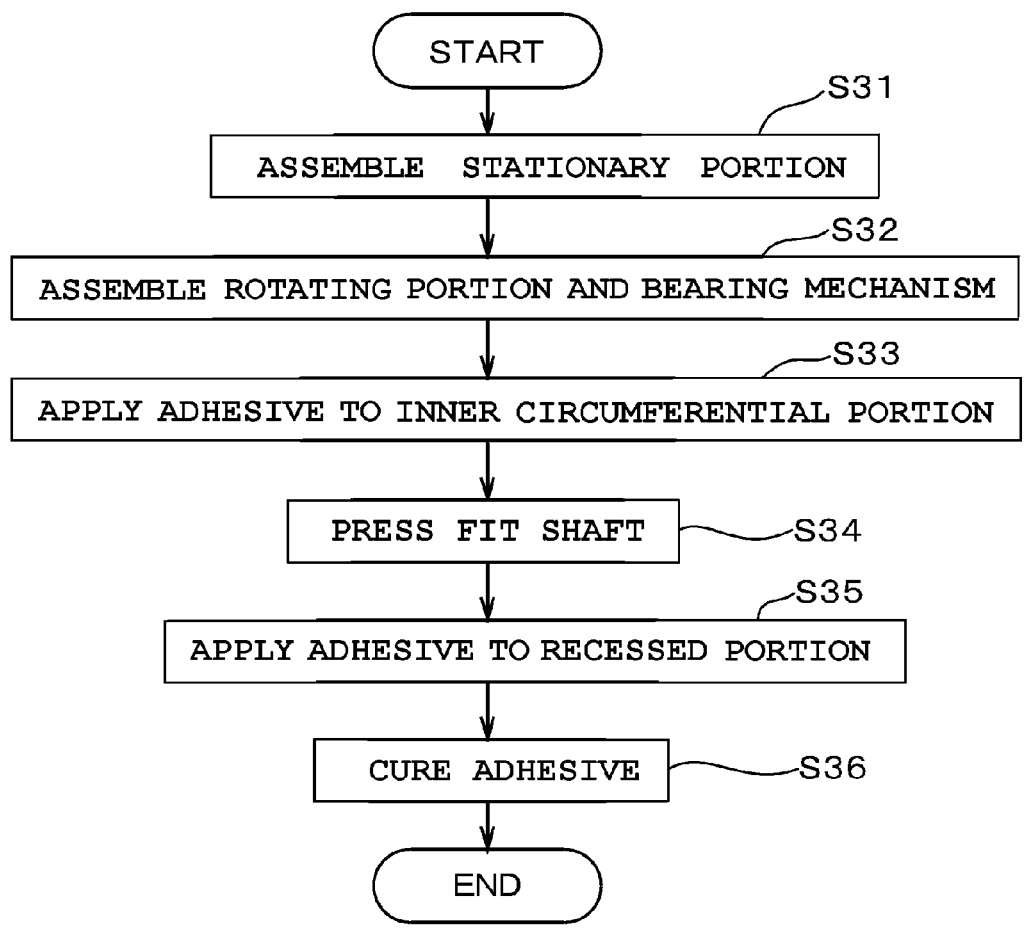
FIG. 13 is a flowchart illustrating a procedure of assembling the motor according to the second preferred embodiment of the present invention.

FIG. 13 is a flowchart illustrating a procedure of assembling the motor according to the second preferred embodiment. First, as with the procedure according to the first preferred embodiment, a stationary portion 2 is assembled, and a rotating portion 3 and a bearing mechanism 4 are assembled as a single assembly 121 (steps S31 and S32). Next, the adhesive 7, which is now in the liquid state, is applied to all circumferential positions on the inner circumferential surface upper portion 231 of the inner circumferential portion 23 in a manner similar to that illustrated in FIG. 10 (step S33). Referring to FIG. 11, the shaft lower portion 412 is press fitted to the inner circumferential portion 23 (step S34). At this time, the adhesive 7 is spread to the inner circumferential surface lower portion 233. The seal gap 821 is defined between the inserted outer circumferential surface 413 of the shaft lower portion 412 and the inner circumferential surface lower portion 233, and most of the adhesive 7 is held in the seal gap 821.

Next, referring to FIG. 12, with the base plate 21 turned upside down, an additional adhesive 7, which is now in the liquid state, is applied to the recessed portion 833 in the annular chamfer portion 83*a* (step S35). The adhesive 7 travels in the direction of the press-fitting region 81 illustrated in FIG. 11 into the seal gap 821, that is, to the far side of the page of FIG. 12, and the adhesive 7 is spread substantially evenly in the circumferential direction. At this time, air inside the seal gap 821 travels through a portion of the annular chamfer portion 83 which does not abut on the recessed portion 833 to an outside of the base plate 21, so that little or no air remains in the seal gap 821. The adhesive 7 is thereafter heated and cured (step S36) to complete the operation of assembling the motor.

Also in the motor according to the second preferred embodiment, the adhesive 7 is arranged in the seal gap 821 over the entire circumference thereof, and this contributes to preventing the internal gas from leaking out through the gap defined between the shaft 41 and the inner circumferential portion 23. Moreover, after the shaft 41 is temporarily fixed to the base plate 21, the adhesive 7, which is then in the liquid state, is applied to only the recessed portion 833 in the annular chamfer portion 83*a*. This contributes to efficiently discharging the air inside the seal gap 821 to the outside of the base plate 21 through a portion of the annular chamfer portion 83*a* which does not abut on the recessed portion 833. That is, the air inside the seal gap 821 is caused to travel to the outside of the base plate 21 in parallel with the spreading of the adhesive 7 through the seal gap 821, so that the air is replaced by the adhesive 7.

Figure 14:
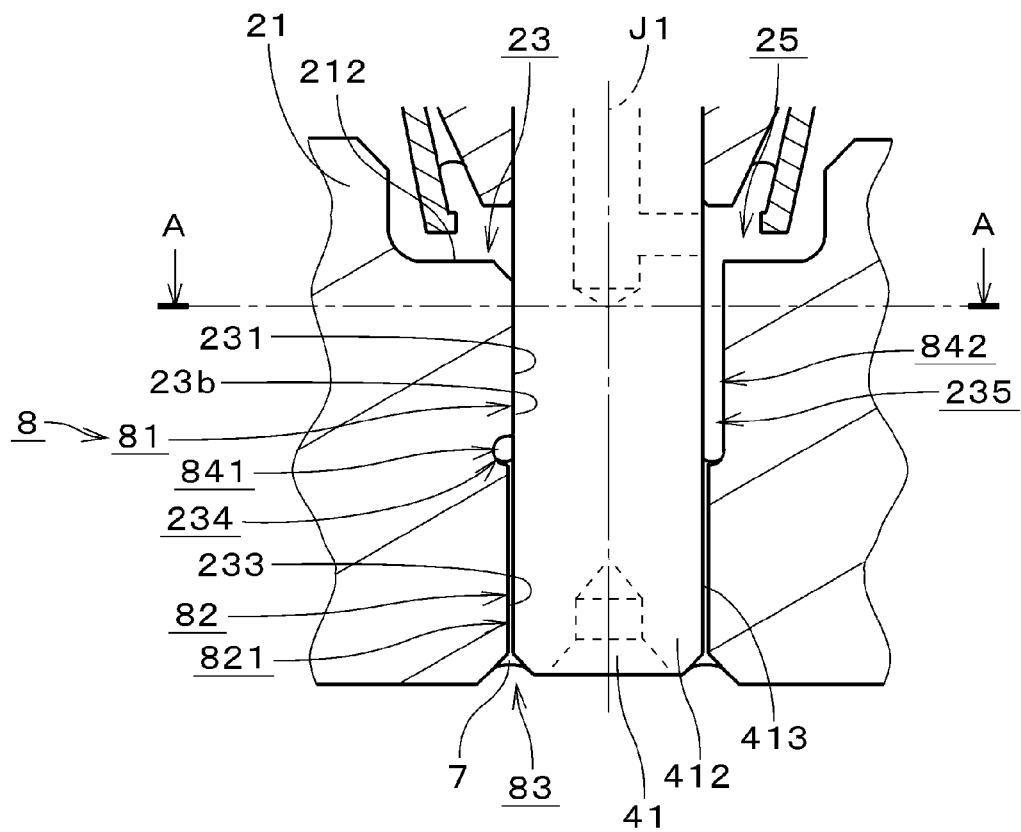
FIG. 14 is a diagram illustrating a lower portion of a shaft of a motor and its vicinity according to a third preferred embodiment of the present invention.

FIG. 14 is a diagram illustrating a shaft lower portion 412 of a motor according to a third preferred embodiment of the present invention and its vicinity. As with the second preferred embodiment, an inner circumferential surface 23*b* of an inner circumferential portion 23 includes an inner circumferential surface upper portion 231 defined by a cylindrical surface, and an inner circumferential surface lower portion 233 defined by a cylindrical surface having a diameter slightly greater than that of the inner circumferential surface upper portion 231. A first groove portion 234 which is annular and which extends in the circumferential direction is defined between the inner circumferential surface upper portion 231 and the inner circumferential surface lower portion 233. At least one second groove portion 235, each of which extends in the axial direction, is defined in the inner circumferential surface upper portion 231. That is, the inner circumferential portion 23 according to the third preferred embodiment preferably is similar in structure to the inner circumferential portion 23 according to the second preferred embodiment except that the recessed portion 833 is eliminated, and that the first groove portion 234 and the second groove portion(s) 235 are provided. The motor according to the third preferred embodiment preferably is similar in structure to the motor according to the first preferred embodiment except in the structure of the inner circumferential portion 23. Accordingly, like members or portions are designated by like reference numerals, and redundant description is omitted. Note that the number of second groove portions 235 may be more than one.

In a fixing region 8, a gap 841 extending over an entire circumference is defined between the first groove portion 234 and an inserted outer circumferential surface 413 of the shaft lower portion 412. The gap 841 is defined at a boundary between a press-fitting region 81 and an adhesion region 82, that is, at a boundary between the seal gap 821 and the press-fitting region 81. The gap 841 is in connection with the seal gap 821. The radial width of the gap 841 is greater than that of the seal gap 821. The gap 841 can be considered as a portion of the seal gap 821 which is arranged to have an increased width. Hereinafter, the gap 841 will be referred to as an "increased-width gap portion 841".

Figure 15:
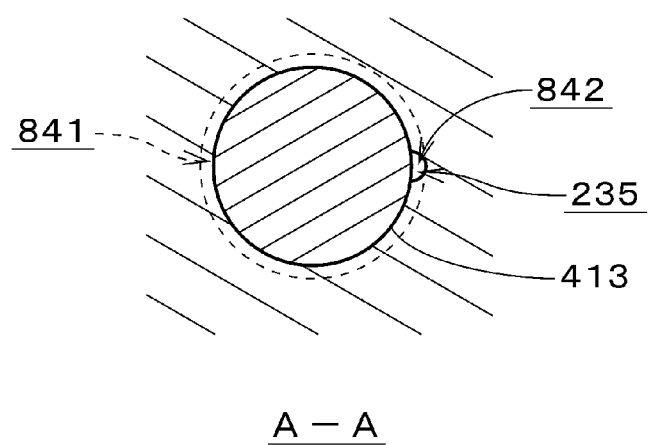
FIG. 15 is a cross-sectional view of the shaft and a base plate according to the third preferred embodiment of the present invention.

FIG. 15 is a cross-sectional view of a shaft 41 and a base plate 21 illustrated in FIG. 14 taken along line A-A in FIG. 14. Referring to FIGS. 14 and 15, a communicating channel 842 extending in the axial direction is defined between the second groove portion 235 and the inserted outer circumferential surface 413. The communicating channel 842 is arranged to connect the increased-width gap portion 841 with a space 25 defined on an upper side of an upper surface 212 of the inner circumferential portion 23 illustrated in FIG. 14. The radial width of the communicating channel 842 is preferably greater than that of the seal gap 821. The communicating channel may be defined either within a base portion or between a lower portion of the shaft 41 and an inner circumferential portion 23 of the base portion.

A procedure of assembling the motor according to the third preferred embodiment is preferably similar to that according to the second preferred embodiment. When the shaft lower portion 412 is inserted into the inner circumferential portion 23, the shaft lower portion 412 is press fitted to the inner circumferential portion 23 in a situation in which an adhesive 7, which is now in the liquid state, has been applied to all circumferential positions on the inner circumferential surface upper portion 231. At this time, the adhesive 7 is caused to spread into the increased-width gap portion 841. Note, however, that the amount of the adhesive 7 is adjusted so that the adhesive 7 may not fill up the increased-width gap portion 841 and the communicating channel 842.

Next, with the base plate 21 turned upside down, an additional adhesive 7, which is now in the liquid state, is preferably applied to all circumferential positions in an annular chamfer portion 83. The adhesive 7 travels in the direction of the increased-width gap portion 841 into the seal gap 821. At this time, air inside the seal gap 821 travels through the increased-width gap portion 841 and the communicating channel 842 to the space 25 defined on the upper side of the upper surface 212 of the base plate 21.

The adhesive 7 is spread substantially evenly in the entire seal gap 821. Thereafter, the base plate 21 is heated to cure the adhesive 7.

In the third preferred embodiment, as well as in the first preferred embodiment, the adhesive 7 is arranged in the seal gap 821 over the entire circumference thereof, and this contributes to preventing a leakage of a gas arranged inside a disk drive apparatus 1. Moreover, by providing the increased-width gap portion 841 and the communicating channel 842, it is possible to more securely prevent air from remaining in the seal gap 821. Even if air remains in a portion of the seal gap 821 which is in the vicinity of the increased-width gap portion 841, the air is caused to travel through the increased-width gap portion 841 and the communicating channel 842 to the space 25 when the base plate 21 is heated, which prevents an increase in pressure in the seal gap 821 due to an expansion of the air. This contributes to preventing the adhesive 7 from leaking out of the seal gap 821.

In the third preferred embodiment, the adhesive 7 may be arranged in the increased-width gap portion 841 over an entire circumference thereof. Also, the adhesive 7 may be arranged to close a lower portion of the communicating channel 842. Also, if the adhesive 7 applied in the first instance does not close the communicating channel 842 when the shaft 41 is inserted into the inner circumferential portion 23, the radial width of the communicating channel 842 may be equal to that of the seal gap 821. In the assembly of the motor, the adhesive 7 may be applied to the annular chamfer portion 83 in a situation in which a lower surface of the base plate 21 is arranged to face downward. Even in this case, the adhesive 7 is allowed to enter into the seal gap 821 through capillary action. The same holds true for a fourth preferred embodiment of the present invention described below.

Figure 16:
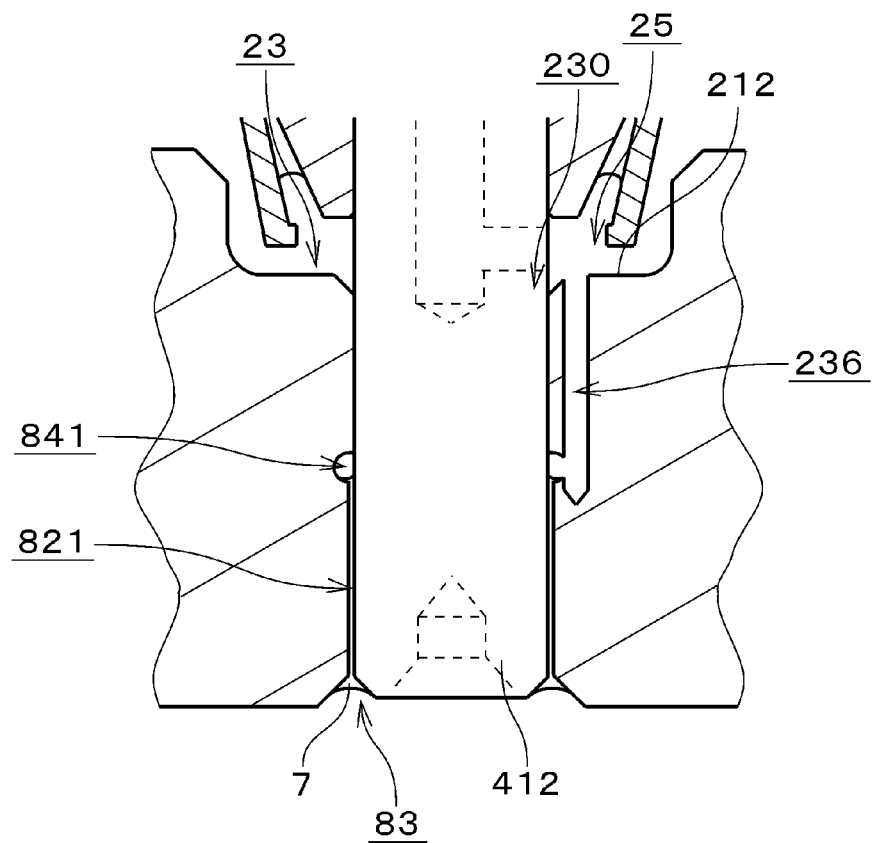
FIG. 16 is a diagram illustrating a lower portion of a shaft of a motor and its vicinity according to a fourth preferred embodiment of the present invention.
Figure 17:
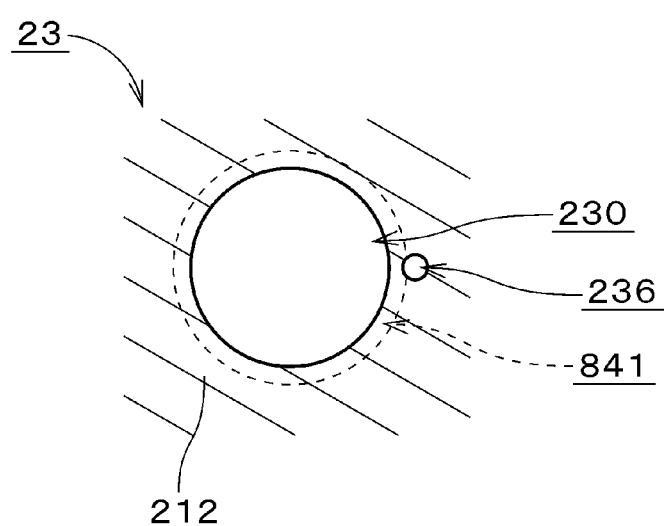
FIG. 17 is a plan view of a base plate according to the fourth preferred embodiment of the present invention.

FIG. 16 is a diagram illustrating a shaft lower portion 412 of a motor according to the fourth preferred embodiment and its vicinity. FIG. 17 is a plan view of an inner circumferential portion 23 of a base plate 21. In FIG. 17, an upper surface 212 of the inner circumferential portion 23 is indicated by parallel oblique lines. In place of the second groove portion 235 illustrated in FIGS. 14 and 15, a hole portion 236 is defined in the inner circumferential portion 23. The hole portion 236 is arranged near a through hole 230, and arranged to extend from the upper surface 212 in the axial direction. The motor according to the fourth preferred embodiment preferably is otherwise similar in structure to the motor according to the third preferred embodiment. A portion of an increased-width gap portion 841 is in connection with a radially inner portion of an inside surface of the hole portion 236. In the fourth preferred embodiment, the hole portion 236 preferably defines a communicating channel that joins the increased-width gap portion 841 to a space 25 defined on an upper side of the inner circumferential portion 23.

A procedure of assembling the motor according to the fourth preferred embodiment preferably is similar to the procedure of assembling the motor according to the third preferred embodiment. In the assembly of the motor, an adhesive 7 applied to an annular chamfer portion 83 illustrated in FIG. 16 enters into a seal gap 821, so that air inside the seal gap 821 is caused to travel to the space 25 through the increased-width gap portion 841 and the hole portion 236. This contributes to securely preventing air from remaining in the seal gap 821 as in the third preferred embodiment.

Also in the fourth preferred embodiment, the adhesive 7 is arranged in the seal gap 821 over an entire circumference thereof, and this contributes to preventing a leakage of a gas arranged inside a disk drive apparatus 1.

A method of manufacturing a spindle motor according to a preferred embodiment of the present invention preferably includes the steps of: press fitting a lower portion of a shaft into a through hole defined in a base portion; applying an adhesive to a seal gap which is defined on a lower side of a press-fitting region between the lower portion of the shaft and an inner circumferential portion of the base portion, and which is arranged to gradually decrease in radial width with increasing height; and curing the adhesive, which is arranged in the seal gap over an entire circumference thereof.

A method of manufacturing a spindle motor according to another preferred embodiment of the present invention preferably includes the steps of: applying an adhesive to an inner circumferential portion of a base portion including a through hole defined therein; press fitting a lower portion of a shaft into the through hole; and curing the adhesive, which is located at all circumferential positions in a seal gap which is defined on a lower side of a press-fitting region between the lower portion of the shaft and the inner circumferential portion of the base portion, and which is arranged to gradually decrease in radial width with increasing height.

A method of manufacturing a spindle motor according to yet another preferred embodiment of the present invention preferably includes the steps of: applying an adhesive to an inner circumferential portion of a base portion including a through hole defined therein; press fitting a lower portion of a shaft into the through hole; applying an additional adhesive to a recessed portion which is defined in the lower portion of the shaft or a lower axial end portion of an inner circumferential surface of the inner circumferential portion of the base portion, and which is in connection with a seal gap defined on a lower side of a press-fitting region between the lower portion of the shaft and the inner circumferential portion of the base portion; and curing the adhesive, which is arranged in the seal gap over an entire circumference thereof.

Features of the above-described preferred embodiments and the modifications thereof may be combined appropriately as long as no conflict arises. While preferred embodiments of the present invention have been described above, it is to be understood that variations and modifications will be apparent to those skilled in the art without departing from the scope and spirit of the present invention. The scope of the present invention, therefore, is to be determined solely by the following claims.

For example, in a modification of the first preferred embodiment, the lower portion of the inserted outer circumferential surface 413 may be defined by an angled surface arranged to gradually decrease in diameter with increasing height, and a seal gap may be defined between the lower portion of the inserted outer circumferential surface 413 and the inner circumferential surface lower portion 232, which is defined by an angled surface. In a modification of the second preferred embodiment, a portion of the chamfer 831 of the shaft lower portion 412 may include a recessed portion that is recessed upward in the annular chamfer portion 83*a*. Also, both the shaft lower portion 412 and the inner circumferential portion 23 may be arranged to include such recessed portions.

In the third preferred embodiment described above, the increased-width gap portion 841 is preferably defined at the boundary between the press-fitting region 81 and the seal gap 821. Note, however, that this is not essential to the present invention. For example, in a modification of the third preferred embodiment, the increased-width gap portion may be defined, away from the aforementioned boundary in a portion of the seal gap 821 which is in the vicinity of the press-fitting region 81. That is, it may be so arranged that a portion of the seal gap 821 is arranged below the aforementioned boundary, the increased-width gap portion 841 is arranged below this portion of the seal gap 821, and the remaining portion of the seal gap 821 is arranged below the increased-width gap portion 841. The same holds true for the fourth preferred embodiment.

Also, the inserted outer circumferential surface 413 of the shaft lower portion 412 may be arranged to include an annular groove portion defined therein as the increased-width gap portion 841. The inserted outer circumferential surface 413 may be arranged to include a groove portion extending in the axial direction and defined therein as the communicating channel 842. A plurality of communicating channels 842 may be defined in the fixing region 8. In a modification of the fourth preferred embodiment, a plurality of hole portions 236 may be provided.

In a modification of the first preferred embodiment, the annular chamfer portion 83 may be provided with a recessed portion 833 as illustrated in FIG. 11. This contributes to more efficiently directing the adhesive 7 into the seal gap 821. Also, an increased-width gap portion 841 and a communicating channel 842 as illustrated in FIG. 14 may be defined between the shaft lower portion 412 and the inner circumferential portion 23. In a modification of the first preferred embodiment, all of the recessed portion 833, the increased-width gap portion 841, and the communicating channel 842 may be provided. Furthermore, a hole portion 236 as illustrated in FIG. 16 may be provided as a communicating channel. In a modification of the second preferred embodiment, an increased-width gap portion 841 and a communicating channel 842 may be defined between the shaft lower portion 412 and the inner circumferential portion 23. Also, a hole portion 236 may be provided as a communicating channel.

In a modification of each of the above-described preferred embodiments, the sealant may be provided along all or only some of the circumferential positions between the screw 153 and both the screw hole portion 410 of the shaft 41 and the hole portion 142*a* of the second housing member 142, and/or along all circumferential positions between the upper portion of the hole portion 142*a* and the head portion 153*a* of the screw 153. This contributes to prevention of a leakage of the gas arranged inside the disk drive apparatus 1. Also, the sealant may not necessarily be an adhesive, but may be an annular resin member preferably made of rubber or the like, for example.

The adhesive 7 is applied to a portion of the annular chamfer portion 83 at step S14 in FIG. 6 in the first preferred embodiment described above. Note, however, that the adhesive 7 may be applied to a plurality of portions of the annular chamfer portion 83 or to all circumferential positions in the annular chamfer portion 83, as long as the air inside the seal gap 821 can be properly discharged.

Figure 18:
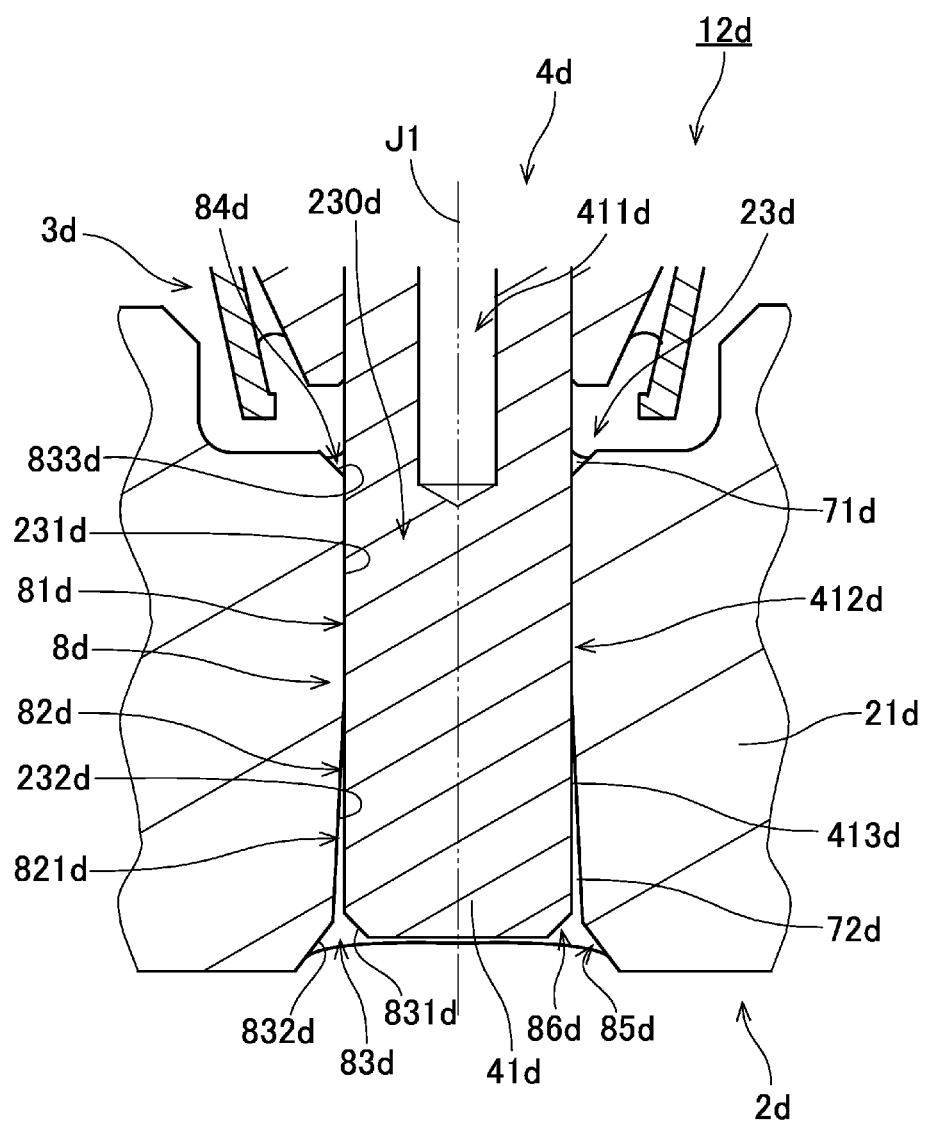
FIG. 18 is a diagram illustrating a lower portion of a shaft of a motor and its vicinity according to a fifth preferred embodiment of the present invention.
Figure 19:
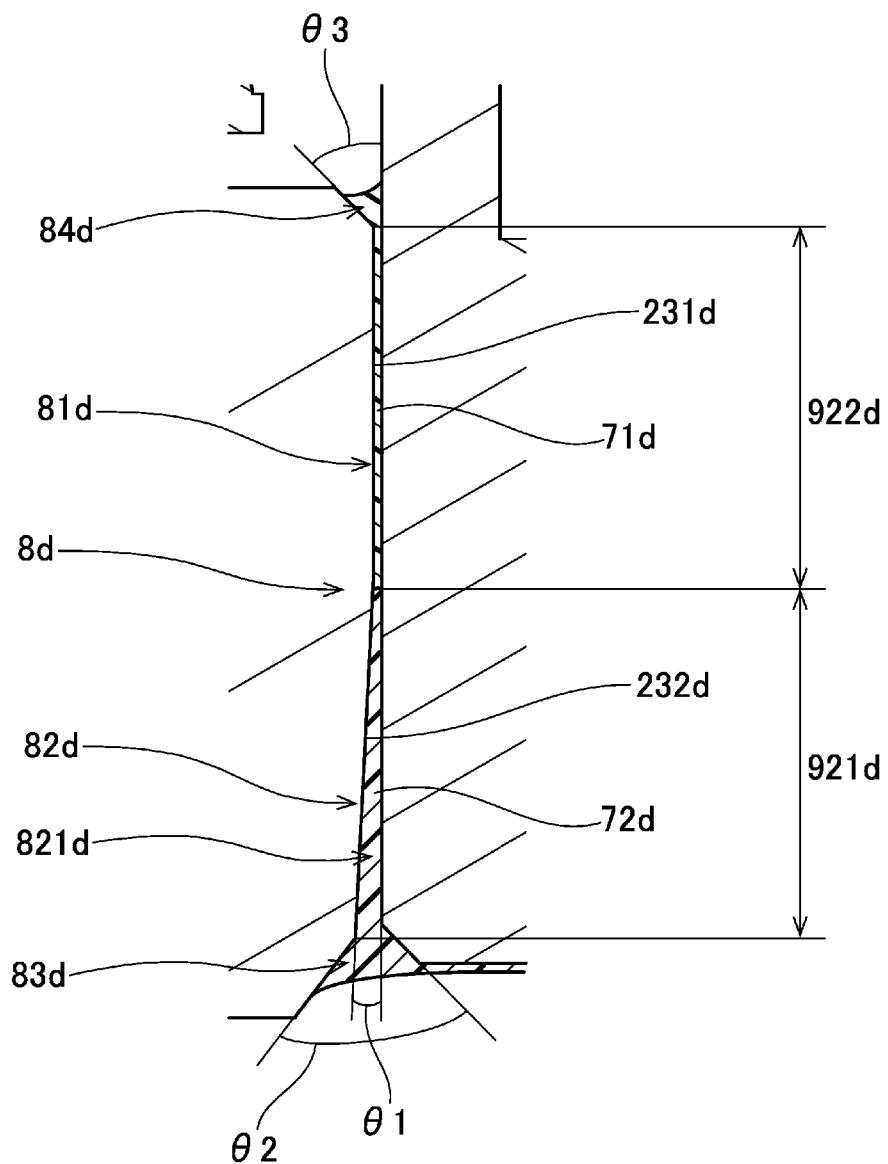
FIG. 19 is a diagram illustrating the lower portion of the shaft of the motor and its vicinity according to the fifth preferred embodiment of the present invention.

FIGS. 18 and 19 are each a diagram illustrating a shaft lower portion 412*d* of a motor 12*d* and its vicinity according to a fifth preferred embodiment of the present invention in an enlarged form. The motor 12*d* is preferably similar in structure to the motor 12 according to the first preferred embodiment except in a portion thereof illustrated in FIG. 18. Descriptions of features and characteristics of the motor 12*d* which are shared by the motor 12 according to the first preferred embodiment will be omitted from the following description.

The motor 12*d* is preferably a disk drive spindle motor used in a disk drive apparatus including a housing which defines an interior space. The motor 12*d* includes a stationary portion 2*d*, a rotating portion 3*d*, and a bearing mechanism 4*d*.

The bearing mechanism 4*d* includes a shaft 41*d*, which is a shaft portion extending in an axial direction. The shaft 41*d* is a columnar member extending along a central axis J1. The shaft 41*d* preferably includes a non-through hole portion 411*d* extending downward from an upper axial end of the shaft 41*d* along the central axis J1. The stationary portion 2*d* includes a through hole 230*d* in which the shaft 41*d* of the bearing mechanism 4*d* is fitted. In addition, the stationary portion 2*d* includes a base plate 21*d*, which is an exemplary base portion which defines a portion of the housing. The rotating portion 3*d* is configured to rotate about the central axis J1 with respect to the stationary portion 2*d* through the bearing mechanism 4*d*.

An outer circumferential surface 413*d* of the shaft lower portion 412*d*, which is a portion of the shaft 41*d* which is inserted in the through hole 230*d*, is a cylindrical surface centered on the central axis J1. Hereinafter, the outer circumferential surface 413*d* will be referred to as an "inserted outer circumferential surface 413*d*". In addition, a portion of the base plate 21*d* which is in the vicinity of the central axis J1 and which includes the through hole 230*d* will be hereinafter referred to as an "inner circumferential portion 23*d*". Moreover, a portion of an inner circumferential surface of the inner circumferential portion 23*d* will be referred to as an "inner circumferential surface upper portion 231*d*", and another portion of the inner circumferential surface of the inner circumferential portion 23*d* will be referred to as an "inner circumferential surface lower portion 232*d*". The inner circumferential surface upper portion 231*d* is a cylindrical surface centered on the central axis J1. The inner circumferential surface lower portion 232*d* is preferably an inclined surface which gradually decreases in diameter with increasing height, and is located below the inner circumferential surface upper portion 231*d*.

A fixing region 8*d* is defined between the inner circumferential portion 23*d* of the base plate 21*d*, which defines the through hole 230*d*, and the inserted outer circumferential surface 413*d*, which is an outer circumferential portion of the bearing mechanism 4*d*. The fixing region 8*d* includes a first region 81*d* and a second region 82*d*.

The first region 81*d* is defined between the inner circumferential surface upper portion 231*d* of the inner circumferential portion 23*d* and the inserted outer circumferential surface 413*d* of the shaft lower portion 412*d*. At the first region 81*d*, the inner circumferential surface upper portion 231*d*, which is a portion of an inner circumferential surface of the base plate 21, and the inserted outer circumferential surface 413*d*, which is a portion of an outer circumferential surface of the shaft 41*d*, are fixed to each other through press fitting and adhesion. Accordingly, at the first region 81*d*, a first adhesive 71*d* is preferably provided between the inner circumferential surface upper portion 231*d* and the inserted outer circumferential surface 413*d*. Note that, at the first region 81*d*, the inner circumferential portion 23*d* and an outer circumferential portion of the shaft lower portion 412*d* may alternatively be fixed to each other by any other desirable method, such as, for example, simple press fitting or shrink fitting.

The second region 82*d* is located below the first region 81*d*, and is defined between the inner circumferential surface lower portion 232*d* of the inner circumferential portion 23*d* and the inserted outer circumferential surface 413*d* of the shaft 41*d*. At the second region 82*d*, a seal gap 821*d* is preferably defined between the inner circumferential portion 23*d* and the outer circumferential portion of the shaft lower portion 412*d*. A radial width of the seal gap 821*d* gradually decreases with increasing height. In addition, in the seal gap 821*d* at the second region 82*d*, a second adhesive 72*d* is provided between the inner circumferential surface lower portion 232*d* and the inserted outer circumferential surface 413*d*.

In the seal gap 821*d*, the second adhesive 72*d* is arranged over an entire circumferential extent thereof. Thus, a gap between the shaft 41*d* and the inner circumferential portion 23*d* of the base plate 21*d* is sealed in the seal gap 821*d*. This reduces the likelihood that a gas will leak out of the housing through the gap between the shaft 41*d* and the inner circumferential portion 23*d*.

Each of the first adhesive 71*d* and the second adhesive 72*d* is preferably, for example, an epoxy thermosetting adhesive. Note that each of the first adhesive 71*d* and the second adhesive 72*d* may alternatively be an adhesive which is not an epoxy adhesive, and may be any other desirable type of adhesive, such as, for example, a light-curing adhesive or an adhesive which is cured by drying.

Here, the second adhesive 72*d* has a glass transition temperature lower than a glass transition temperature of the first adhesive 71*d*. That is, the first adhesive 71*d*, which has a high glass transition temperature and a high joining strength, is used in the first region 81*d*. This leads to an improvement in strength with which the inner circumferential portion 23*d* and the outer circumferential portion of the shaft lower portion 412*d* are fixed to each other. Meanwhile, the second adhesive 72*d*, which is used in the second region 82*d*, has a low glass transition temperature and is flexible even at an ordinary temperature, is highly resistant to a temperature change due to a heat shock, and has a high sealing capability. In the motor 12*d*, the second adhesive 72*d* as described above is provided over the entire circumferential extent of the seal gap 821*d*, and the gap between the shaft 41*d* and the inner circumferential portion 23*d* is thus more securely sealed. This contributes to further reducing the likelihood that the gas will leak out of the housing through the gap between the shaft 41*d* and the inner circumferential portion 23*d* of the base plate 21*d*.

Note that, although the second adhesive 72*d* is referred to as an adhesive for the sake of convenience, the second adhesive 72*d* may not necessarily have a sufficient adhesive strength to fix the shaft 41*d* and the base plate 21*d* to each other. In other words, the second adhesive 72*d* may merely be a material which has a sufficient sealing capability to seal the gap between the shaft 41*d* and the inner circumferential portion 23*d* of the base plate 21*d*, but not adhere the shaft 41*d* and the inner circumferential portion 23*d* of the base plate 21*d* to one another. Similarly, although the second region 82*d* is referred to as a portion of the "fixing" region 8*d* for the sake of convenience, a joint strength sufficient to fix the shaft 41*d* and the base plate 21d to each other may not necessarily be provided at the second region 82d.

Also note that, although the first adhesive 71d and the second adhesive 72d used in the motor 12d are preferably different types of adhesives, this is not essential to the present invention. Each of the first adhesive 71d and the second adhesive 72d may be the same type of adhesive. In other words, the same type of adhesive may be used for both the press fitting and adhesion between the shaft 41d and the base plate 21d and the sealing of the gap between the shaft 41d and the base plate 21d.

Referring to FIG. 19, in the fixing region 8d, an axial dimension 921d of the second region 82d is preferably equal or substantially equal to an axial dimension 922d of the first region 81d. The axial dimension 921d of the second region 82d and the axial dimension 922d of the first region 81d are thus chosen such that the axial dimension 921d of the second region 82d is preferably in a range of about 0.5 times to twice the axial dimension 922d of the first region 81d, both inclusive. To increase the strength with which the shaft 41d and the base plate 21d are fixed to each other, an increase in the axial dimension 922d of the first region 81d is preferable. Meanwhile, to improve an effect of the sealing, an increase in the axial dimension 921d of the second region 82d is preferable. Thus, to combine the fixing strength with the sealing effect, a relationship between the axial dimension 921d of the second region 82d and the axial dimension 922d of the first region 81d is preferably chosen such that neither exceeds twice the other.

The shaft 41d of the motor 12d is preferably made of, for example, stainless steel, and preferably has a coefficient of linear expansion of about $10 \times 10^{-6}$ [/K] to about $12 \times 10^{-6}$ [/K], for example. Meanwhile, the base plate 21d is preferably made of, for example, aluminum, and preferably has a coefficient of linear expansion of about $23 \times 10^{-6}$ [/K], for example. Thus, the coefficient of linear expansion of the shaft 41d is smaller than the coefficient of linear expansion of the base plate 21d. Therefore, a gap may occur between the shaft 41d and the base plate 21d under a high temperature condition. However, in the case of the motor 12d, the second adhesive 72d provided in the seal gap 821d in the second region 82d reduces the likelihood that the gas will leak out of the housing through the gap between the shaft 41d and the inner circumferential portion 23d of the base plate 21d even under the high temperature condition.

In addition, the second adhesive 72d preferably has a coefficient of linear expansion of about $30 \times 10^{-6}$ [/K], for example. Therefore, the coefficient of linear expansion of the second adhesive 72d is greater than both the coefficient of linear expansion of the shaft 41d and the coefficient of linear expansion of the base plate 21d. If the coefficient of linear expansion of the second adhesive 72d were smaller than both the coefficient of linear expansion of the shaft 41d and the coefficient of linear expansion of the base plate 21d, the second adhesive 72d might come off the shaft 41d or the base plate 21d under the high temperature condition. In the case of the motor 12d, because the coefficient of linear expansion of the second adhesive 72d is greater than both the coefficient of linear expansion of the shaft 41d and the coefficient of linear expansion of the base plate 21d, the likelihood that the second adhesive 72d will come off under the high temperature condition is reduced. That is, the second adhesive 72d maintains an excellent sealing effect even under the high temperature condition. This contributes to further reducing the likelihood that the gas will leak out of the housing through the gap between the shaft 41d and the inner circumferential portion 23d of the base plate 21d even under the high temperature condition.

In the motor 12d, the fixing region 8d preferably includes a lower tapered gap 83d located below the second region 82d, and an upper tapered gap 84d located above the first region 81d. The lower tapered gap 83d is arranged to gradually increase in radial width with decreasing height. Meanwhile, the upper tapered gap 84d gradually increases in radial width with increasing height.

An upper chamfered surface 833d is located at an upper axial end of the inner circumferential surface of the inner circumferential portion 23d of the base plate 21d. In other words, the inner circumferential portion 23d includes the upper chamfered surface 833d, which gradually increases in diameter with increasing height, above the inner circumferential surface upper portion 231d. The upper tapered gap 84d is defined between the upper chamfered surface 833d of the inner circumferential portion 23d and the inserted outer circumferential surface 413d of the shaft 41d.

A shaft chamfered surface 831d is preferably defined at a lower axial end of the shaft 41d and below the inserted outer circumferential surface 413d. In other words, the shaft 41d includes the shaft chamfered surface 831d, which gradually decreases in diameter with decreasing height, below the inserted outer circumferential surface 413d. In addition, a lower chamfered surface 832d is defined at a lower axial end of the inner circumferential surface of the inner circumferential portion 23d of the base plate 21d. In other words, the inner circumferential portion 23d includes the lower chamfered surface 832d, which gradually increases in diameter with decreasing height, below the inner circumferential surface lower portion 232d. The lower tapered gap 83d is defined between the lower chamfered surface 832d of the inner circumferential portion 23d and the shaft chamfered surface 831d of the shaft 41d.

Thus, the lower chamfered surface 832d defines an outer recessed portion 85d which is recessed radially outward from a lower axial end portion of a portion of the base plate 21d which defines the through hole 230d. Meanwhile, the shaft chamfered surface 831d defines an inner recessed portion 86d which is recessed radially inward at a lower axial end portion of the shaft 41d of the bearing mechanism 4d. Each of the outer recessed portion 85d and the inner recessed portion 86d extends all the way around the shaft 41d, and is joined to the seal gap 821d. The second adhesive 72d is continuously provided in the seal gap 821d and the lower tapered gap 83d, which is defined by the outer recessed portion 85d and the inner recessed portion 86d.

When the motor 12d is assembled, the shaft 41d and the base plate 21d are preferably first press fitted and adhered to each other. Thereafter, with the shaft 41d and the base plate 21d turned upside down, the second adhesive 72d is applied to the seal gap 821d for additional adhesion. In other words, the second adhesive 72d, which is now in a liquid state before being cured, is applied to at least one location in the lower tapered gap 83d. As a result, the second adhesive 72d enters into the seal gap 821d, and spreads in the seal gap 821d evenly or substantially evenly in the circumferential direction.

Because, below the seal gap 821d, at least one of the outer recessed portion 85d and the inner recessed portion 86d extends all the way around the shaft 41d, a sufficient amount of second adhesive 72d to fill the seal gap 821d is temporarily held between the outer and inner recessed portions 85d and 86d. In addition, in the motor 12d, the lower tapered gap 83d has a volume greater than a volume of the upper tapered gap 84d. This increases the amount of the second adhesive 72d which is able to be held in the lower tapered gap 83d defined by the outer recessed portion 85d and the inner recessed portion 86d.

This contributes to more securely sealing the seal gap 821d with the second adhesive 72d. This in turn contributes to further reducing the likelihood that the gas will leak out of the housing through the gap between the shaft 41d and the inner circumferential portion 23d of the base plate 21d. Moreover, because the second adhesive 72d is thus held within the lower tapered gap 83d after application of the second adhesive 72d, the second adhesive 72d is preferably prevented from leaking out to a lower surface of the base plate 21d.

In the motor 12d, an angle θ1 defined between the inner circumferential surface lower portion 232d and the inserted outer circumferential surface 413d of the shaft 41d in sections of the inner circumferential portion 23d and the shaft 41d taken along a plane including the central axis J1, that is, an opening angle θ1 of the seal gap 821d, is preferably in the range of about 3° to about 4°, both inclusive, for example. An angle θ2 defined between the lower chamfered surface 832d and the shaft chamfered surface 831d in the same sections, that is, an opening angle θ2 of the lower tapered gap 83d, is preferably in the range of about 20° to about 50°, both inclusive, for example. In addition, an angle θ3 defined between the upper chamfered surface 833d and the inserted outer circumferential surface 413d of the shaft 41d in the same sections, that is, an opening angle θ3 of the upper tapered gap 84d, is preferably in the range of about 5° to about 10° both inclusive, for example.

As described above, the opening angle θ2 of the lower tapered gap 83d is greater than both the opening angle θ1 of the seal gap 821d and the opening angle θ3 of the upper tapered gap 84d. As described above, the opening angle θ2 of the lower tapered gap 83d is large enough to allow the second adhesive 72d to be easily drawn from the lower tapered gap 83d into the seal gap 821d by capillary action when the second adhesive 72d is applied for the additional adhesion. This contributes to more securely sealing the seal gap 821d with the second adhesive 72d. This in turn contributes to further reducing the likelihood that the gas will leak out of the housing through the gap between the shaft 41d and the inner circumferential portion 23d of the base plate 21d.

In the motor 12d, the through hole 230d of the base plate 21d is preferably defined by, for example, a cutting process. After the through hole 230d is defined by the cutting process, for example, only the inner circumferential surface upper portion 231d of the inner circumferential surface of the inner circumferential portion 23d is subjected to a grinding process. Therefore, in the inner circumferential portion 23d of the base plate 21d, the inner circumferential surface upper portion 231d is a ground surface, while each of the inner circumferential surface lower portion 232d, the upper chamfered surface 833d, and the lower chamfered surface 832d is a cut surface. Meanwhile, the outer circumferential surface of the shaft 41d is subjected to a grinding process. Therefore, the inserted outer circumferential surface 413d of the shaft 41d is a ground surface.

As a result of the above-described process for each member, each of a degree of surface roughness of the inner circumferential surface lower portion 232d, which defines the seal gap 821d, and a degree of surface roughness of the lower chamfered surface 832d, which defines the lower tapered gap 83d, is greater than a degree of surface roughness of the inserted outer circumferential surface 413d of the shaft 41d, which defines both the seal gap 821d and the lower tapered gap 83d.

As described above, at least at the second region 82d, the degree of surface roughness of the inner circumferential surface lower portion 232d is greater than the degree of surface roughness of the inserted outer circumferential surface 413d. Thus, the second adhesive 72d provided in the second region 82d is less likely to leak toward the base plate 21d, which has a greater degree of surface roughness, than toward the shaft 41d, which has a smaller degree of surface roughness.

Furthermore, in the motor 12d, the degree of surface roughness of the lower chamfered surface 832d, which defines the lower tapered gap 83d, is greater than the degree of surface roughness of the inserted outer circumferential surface 413d. Thus, when the second adhesive 72d has a volume greater than a volume of the seal gap 821d, and the second adhesive 72d is provided in the lower tapered gap 83d as well, the second adhesive 72d provided in the lower tapered gap 83d is less likely to leak toward the base plate 21d, which has a greater degree of surface roughness, than toward the shaft 41d, which has a smaller degree of surface roughness.

Thus, the second adhesive 72d, which has been applied into the seal gap 821d for the additional adhesion, is prevented from spreading to the lower surface of the base plate 21d.

In addition, as a result of the above-described process for each member, a degree of surface roughness of the inner circumferential surface upper portion 231d of the base plate 21d, which defines the first region 81d, is smaller than the degree of surface roughness of the inner circumferential surface lower portion 232d, which defines the second region 82d. Each of the inner circumferential surface upper portion 231d and a portion of the inserted outer circumferential surface 413d which together define the first region 81d is a press-fit surface, and is therefore subjected to the grinding process to achieve a reduction in the degree of surface roughness and an improvement in dimensional accuracy. This leads to an improvement in concentricity of a stator of the stationary portion 2d and a magnetic member of the rotating portion 3d.

Referring to FIG. 18, in the motor 12d, a lower axial end surface of the shaft 41d is located at an axial level higher than an axial level of a lower axial end surface of the base plate 21d. In the motor 12d, the second adhesive 72d has a volume greater than a sum of the volume of the seal gap 821d and the volume of the lower tapered gap 83d. Accordingly, a lower surface of the second adhesive 72d is defined below the lower axial end surface of the shaft 41d. However, because the lower axial end surface of the base plate 21d is located at an axial level lower than an axial level of the lower axial end surface of the shaft 41d, the lower surface of the second adhesive 72d is defined at an axial level higher than an axial level of the lower axial end surface of the base plate 21d. Thus, because the lower axial end surface of the shaft 41d is located at an axial level higher than an axial level of the lower axial end surface of the base plate 21d, the second adhesive 72d is more effectively prevented from spreading to the lower surface of the base plate 21d.

Figure 20:
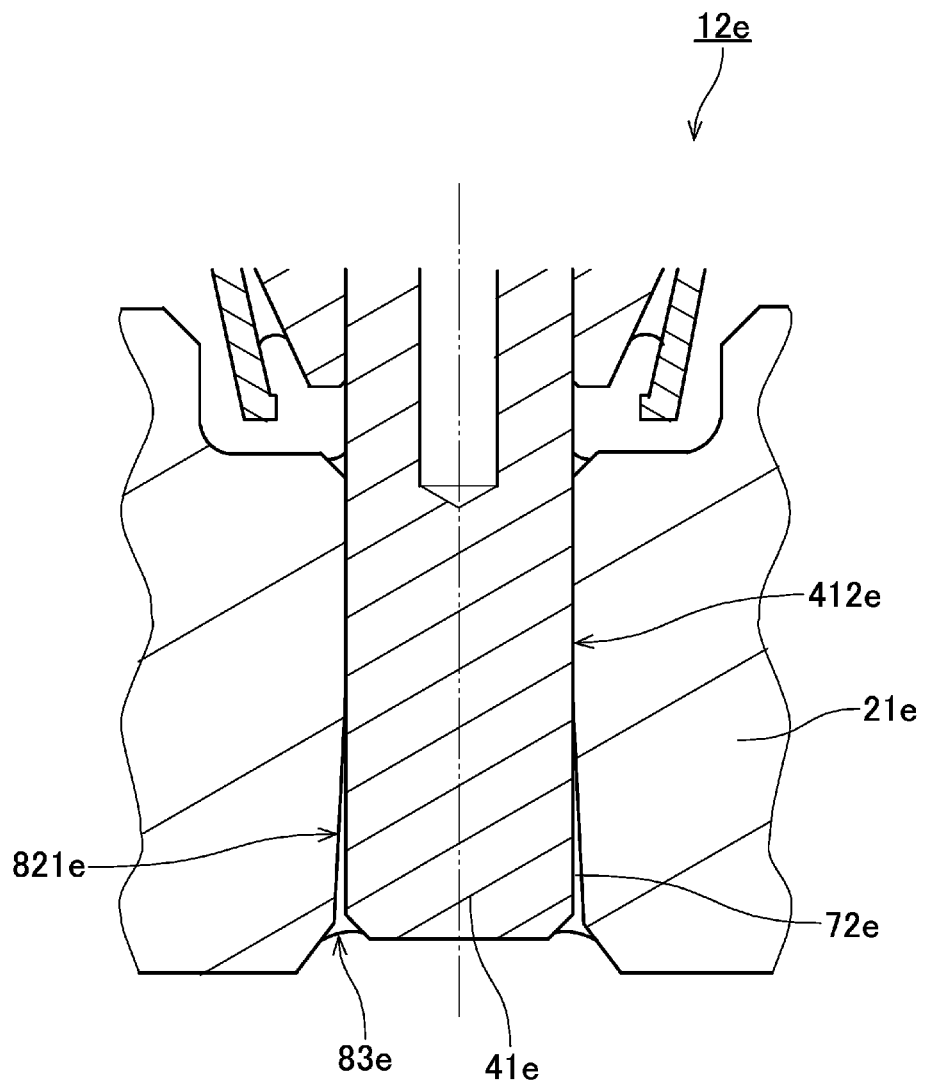
FIG. 20 is a diagram illustrating a lower portion of a shaft of a motor and its vicinity according to a sixth preferred embodiment of the present invention.

FIG. 20 is a diagram illustrating a shaft lower portion 412e of a motor 12e and its vicinity according to a sixth preferred embodiment of the present invention in an enlarged form. The motor 12e is preferably equivalent to the motor 12d according to the fifth preferred embodiment except that a second adhesive 72e is present. Descriptions of features and characteristics of the motor 12e which are shared by the motor 12d according to the fifth preferred embodiment will be omitted from the following description.

Referring to FIG. 20, in the motor 12e, as well as in the motor 12d according to the fifth preferred embodiment, a lower axial end surface of a shaft 41e is preferably located at an axial level higher than an axial level of a lower axial end surface of a base plate 21e. Meanwhile, in the motor 12e, the second adhesive 72e has a volume smaller than a sum of a volume of a seal gap 821e and a volume of a lower tapered gap 83e. Accordingly, a lower surface of the second adhesive 72e is defined at an axial level higher than an axial level of the lower axial end surface of the shaft 41e.

In the motor 12e, the lower surface of the second adhesive 72e is defined at a level higher than both that of the lower axial end surface of the shaft 41e and that of the lower axial end surface of the base plate 21e as described above. Thus, the second adhesive 72e is more effectively prevented from spreading to a lower surface of the base plate 21e.

Figure 21:
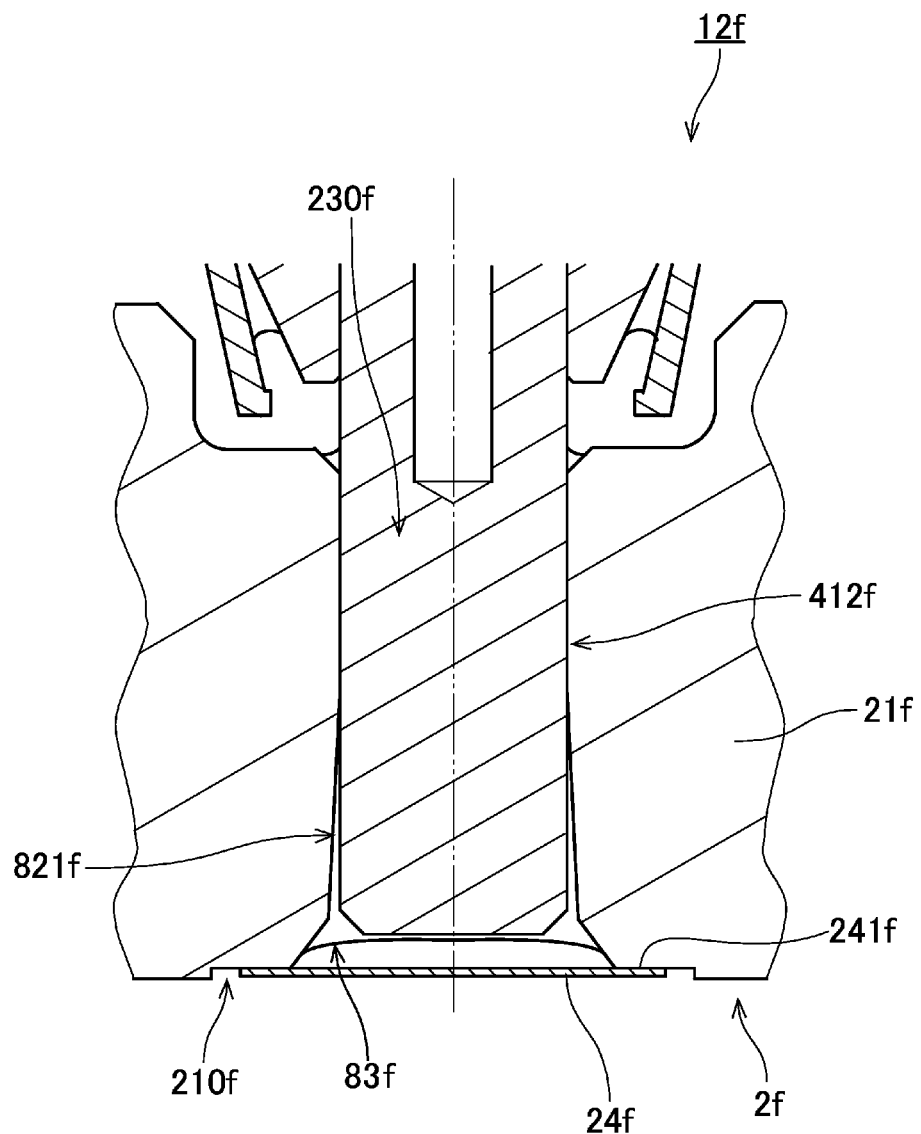
FIG. 21 is a diagram illustrating a lower portion of a shaft of a motor and its vicinity according to a seventh preferred embodiment of the present invention.

FIG. 21 is a diagram illustrating a shaft lower portion 412f of a motor 12f and its vicinity according to a seventh preferred embodiment of the present invention in an enlarged form. The motor 12f is preferably equivalent to the motor 12d according to the fifth preferred embodiment except in a sealing member 24f and the shape of a lower surface of a base plate 21f, which will be described below. Descriptions of features and characteristics of the motor 12f which are shared by the motor 12d according to the fifth preferred embodiment will be omitted from the following description.

Referring to FIG. 21, a stationary portion 2f of the motor 12f includes the sealing member 24f. In addition, the lower surface of the base plate 21f preferably includes an annular recessed portion 210f which is recessed upward from a lower axial end surface of the base plate 21f around a lower opening of a through hole 230f. The sealing member 24f is provided along the lower surface of the base plate 21f in the annular recessed portion 210f.

The sealing member 24f is configured to cover the lower opening of the through hole 230f. In addition, an upper surface of the sealing member 24f includes a contact portion 241f in direct or indirect contact with the lower surface of the base plate 21f. The contact portion 241f is annular, and is configured to surround the lower opening of the through hole 230f. As a result, a communication between a space above the sealing member 24f and a space below the sealing member 24f is prevented. In other words, a communication between a space including a seal gap 821f and a lower tapered gap 83f and a space outside of the motor 12f is prevented. As a result, an effect of sealing in the vicinity of the through hole 230f is improved, and a communication between an interior of the motor 12f and an exterior of the motor 12f is more effectively prevented.

The sealing member 24f preferably is attached to the lower surface of the base plate 21f through an adhesive or an adhesive tape at the contact portion 241f. Note, however, that the sealing member 24f may alternatively be provided along the lower surface of the base plate 21f by any other desirable method.

In addition, in the motor 12f, a lower surface of the sealing member 24f is preferably located at an axial level higher than an axial level of the lower axial end surface of the base plate 21f. This prevents an end portion of the sealing member 24f from making contact with an external object and coming off.

Figure 22:
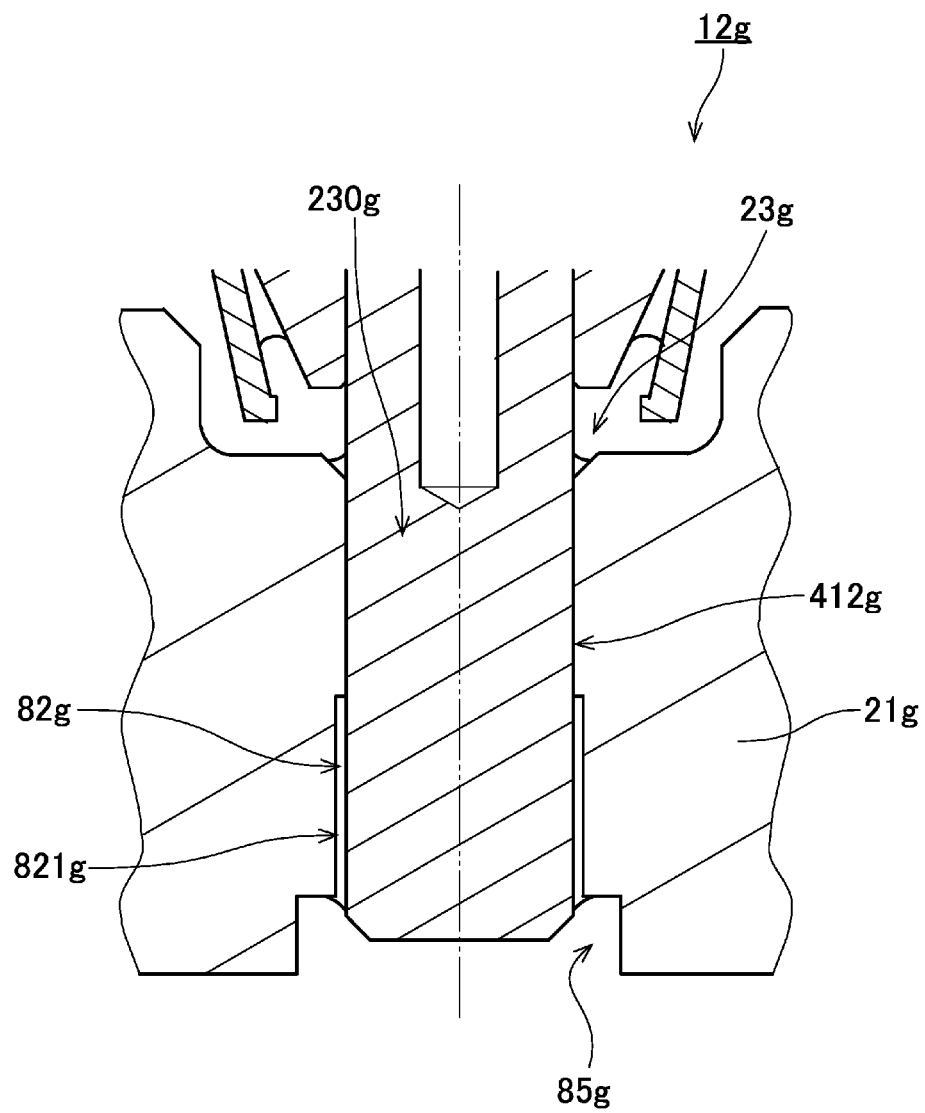
FIG. 22 is a diagram illustrating a lower portion of a shaft of a motor and its vicinity according to an example modification of the fifth preferred embodiment of the present invention.
Figure 23:
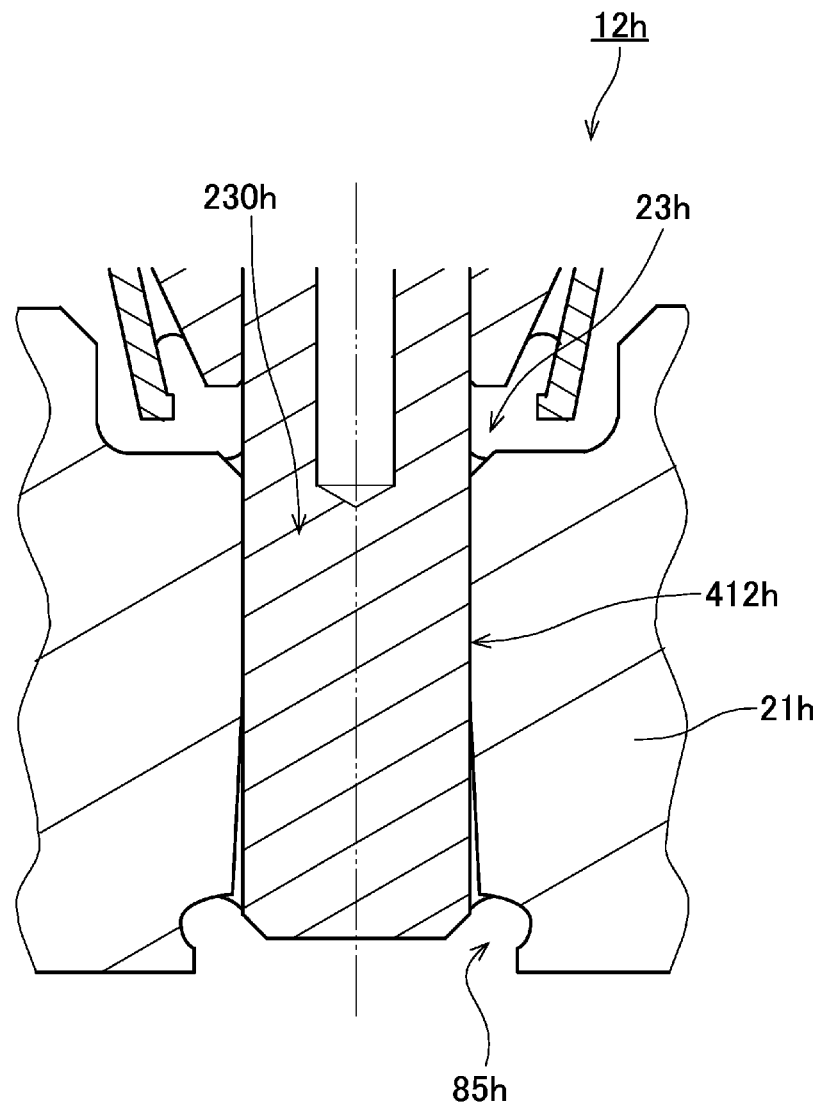
FIG. 23 is a diagram illustrating a lower portion of a shaft of a motor and its vicinity according to an example modification of the fifth preferred embodiment of the present invention.

FIG. 22 is a diagram illustrating a shaft lower portion 412g of a motor 12g and its vicinity according to an example modification of the fifth preferred embodiment of the present invention in an enlarged form. FIG. 23 is a diagram illustrating a shaft lower portion 412h of a motor 12h and its vicinity according to an example modification of the fifth preferred embodiment of the present invention in an enlarged form.

Each of the motors 12g and 12h is preferably different from the motor 12d according to the fifth preferred embodiment in the shape of the outer recessed portion. In the motor 12d, the outer recessed portion 85d is defined by the lower chamfered surface 832d, which gradually increases in diameter with decreasing height. Note, however, that the outer recessed portion may alternatively be a recessed portion which is not defined by a chamfered surface in a tapered shape.

Referring to FIG. 22, in the motor 12g, an outer recessed portion 85g is an annular shoulder portion which is recessed upward from a lower surface of a base plate 21g and is recessed radially outward from a through hole 230g. In other words, the outer recessed portion 85g is in the shape of a shoulder, and extends all the way around a shaft at a lower axial end portion of an inner circumferential portion 23g. Meanwhile, referring to FIG. 23, in the motor 12h, an outer recessed portion 85h is preferably an annular recessed portion which is recessed radially outward from a through hole 230h. In other words, the outer recessed portion 85h extends all the way around a shaft above a lower axial end portion of an inner circumferential portion 23h. In addition, the outer recessed portion 85h is preferably recessed more radially outward relative to an outer edge of a lower opening of the through hole 230h.

As in each of the example modifications illustrated in FIGS. 22 and 23, the outer recessed portion may have a shape other than the tapered shape. Since the outer recessed portion extends all the way around the shaft, a sufficient amount of second adhesive in a liquid state before being cured to fill the seal gap is able to be applied to the outer recessed portion when the second adhesive is applied for the additional adhesion.

In addition, in the motor 12g according to the example modification illustrated in FIG. 22, a seal gap 821g preferably has a uniform or substantially uniform radial width in a second region 82g. In this case, a volume of the seal gap 821g is increased, resulting in an increase in a necessary volume of the second adhesive, compared to the case where the radial width of the seal gap gradually decreases with increasing height. However, since the outer recessed portion 85g extends all the way around the shaft, a sufficient amount of second adhesive in the liquid state before being cured to fill the seal gap 821g is able to be applied to the outer recessed portion 85g when the second adhesive is applied for the additional adhesion.

As described above, also in each of the example modifications illustrated in FIGS. 22 and 23, a sufficient amount of second adhesive is able to be applied to the outer recessed portion, and therefore, a leakage of the adhesive to the lower surface of the base plate does not easily occur. Thus, the adhesive is prevented from spreading to the lower surface of the base plate while allowing the second region to be sealed with the second adhesive to prevent the gas from leaking out of the housing.

Figure 24:
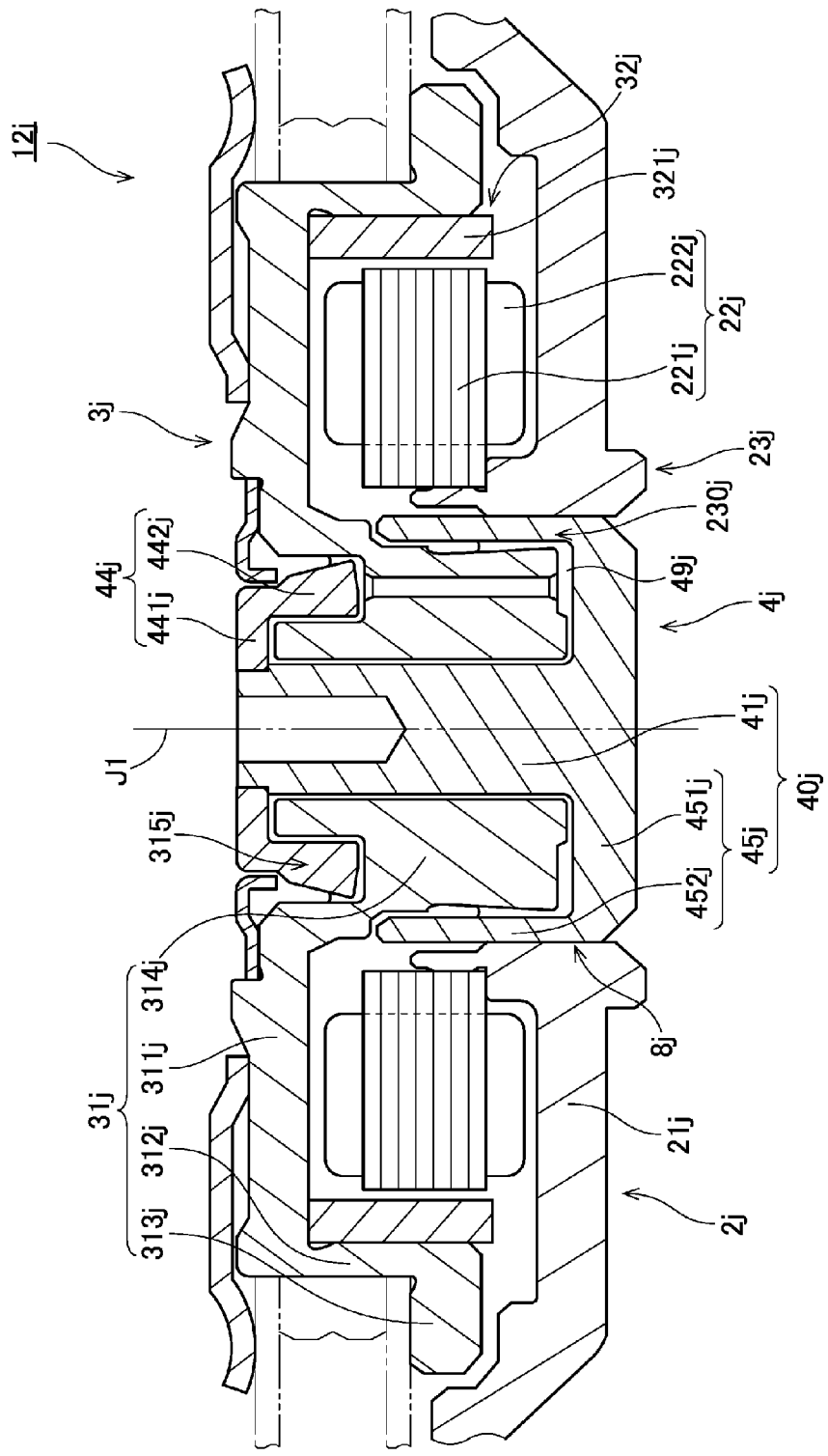
FIG. 24 is a vertical cross-sectional view of a motor according to an eighth preferred embodiment of the present invention.
Figure 25:
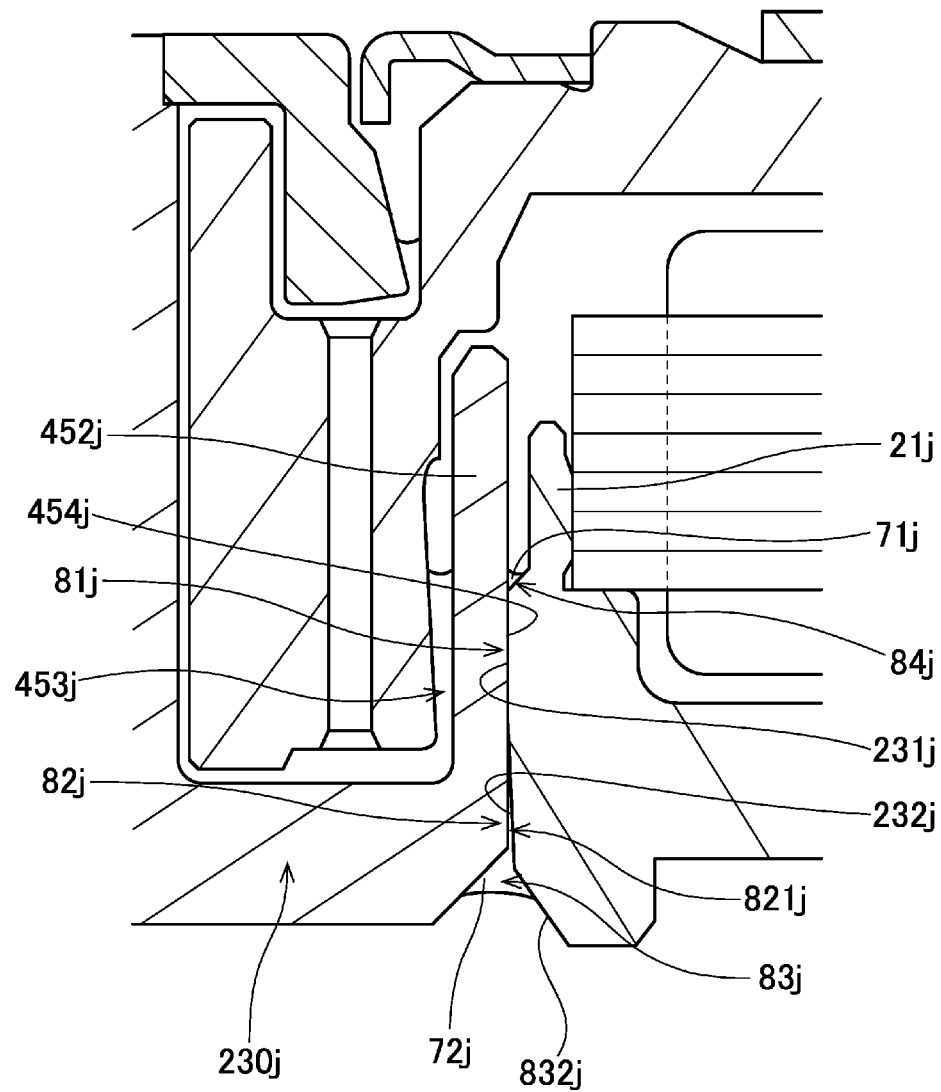
FIG. 25 is a diagram illustrating a lower portion of a shaft portion of the motor and its vicinity according to the eighth preferred embodiment of the present invention.

FIG. 24 is a vertical cross-sectional view of a motor 12j according to an eighth preferred embodiment of the present invention. FIG. 25 is a diagram illustrating a lower portion of a shaft portion 40j of the motor 12j and its vicinity. The motor 12j is an outer-rotor motor. The motor 12j includes a stationary portion 2j, a rotating portion 3j, and a bearing mechanism 4j. The rotating portion 3j is supported through the bearing mechanism 4j to be rotatable about a central axis J1 of the motor 12j with respect to the stationary portion 2j. The central axis J1 of the motor 12j is a central axis of each of the stationary portion 2j, the rotating portion 3j, and the bearing mechanism 4j as well.

The stationary portion 2j preferably includes a base plate 21j, which is an exemplary base portion, and a stator 22j. The base plate 21j defines a portion of a housing of a disk drive apparatus which includes the motor 12j. A through hole 230j passing through the base plate 21j in the axial direction is defined in a center of the base plate 21j. The stator 22j includes a stator core 221j and coils 222j wound around the stator core 221j.

The rotating portion 3j preferably includes a rotor hub 31j and a magnetic member 32j. The rotor hub 31j includes a hub body 311j, a cylindrical portion 312j, a disk mount portion 313j, and a sleeve portion 314j.

The hub body 311j is an annular portion extending in a plate shape. The cylindrical portion 312j projects downward from an outer edge portion of the hub body 311j. The disk mount portion 313j extends radially outward from a lower portion of the cylindrical portion 312j. The sleeve portion 314j is a cylindrical or substantially cylindrical portion extending downward from an inner edge portion of the hub body 311j.

The magnetic member 32j includes a cylindrical or substantially cylindrical rotor magnet 321j. The rotor magnet 321j is fixed to an inside of the cylindrical portion 312j. The rotor magnet 321j is positioned radially opposite to the stator 22j. A torque is produced between the stator 22j and the rotor magnet 321j.

The bearing mechanism 4j preferably includes the shaft portion 40j, an upper cup portion 44j, and a lubricating oil 49j. The shaft portion 40j includes a shaft 41j and a lower cup portion 45j. The lower cup portion 45j includes a bottom portion 451j and a wall portion 452j. The shaft 41j is a columnar portion extending along the central axis J1. The bottom portion 451j is a plate-shaped portion extending radially outward from a lower portion of the shaft 41j. The wall portion 452j is a cylindrical portion extending axially upward from an outer edge of the bottom portion 451j. The lower cup portion 45j preferably assumes or substantially assumes the shape of the letter "L" in a vertical section with the bottom portion 451j and the wall portion 452j. In the motor 12j, the shaft 41j and the lower cup portion 45j are preferably defined by a single continuous monolithic member. Note, however, that the shaft 41j and the lower cup portion 45j may alternatively be defined by separate members.

The upper cup portion 44j preferably includes a plate portion 441j and a tubular portion 442j. The plate portion 441j is a disk-shaped portion extending radially outward from the shaft 41j, and fixed to an outer circumferential surface of the shaft 41j. The tubular portion 442j is a cylindrical portion extending axially downward from an outer edge of the plate portion 441j. The upper cup portion 44j preferably assumes or substantially assumes the shape of the letter "L" in a vertical section with the plate portion 441j and the tubular portion 442j.

The shaft 41j is inserted radially inside the sleeve portion 314j of the rotor hub 31j. In addition, the sleeve portion 314j is inserted radially inside the wall portion 452j of the shaft portion 40j. In addition, the tubular portion 442j of the upper cup portion 44j is inserted in an annular recessed portion 315j, which is recessed downward from an upper surface of the sleeve portion 314j.

The lubricating oil 49j is provided in a minute gap between the sleeve portion 314j and each portion of the shaft portion 40j, and in a minute gap between the sleeve portion 314j and each portion of the upper cup portion 44j. An upper surface of the lubricating oil 49j is preferably defined between an outer circumferential surface of the tubular portion 442j of the upper cup portion 44j and an inner circumferential surface of the sleeve portion 314j which defines the recessed portion 315j. Meanwhile, a lower surface of the lubricating oil 49j is preferably defined between an inner circumferential surface of the wall portion 452j of the lower cup portion 45j and an outer circumferential surface of the sleeve portion 314j. Thus, the rotor hub 31j is supported through the lubricating oil 49j to be rotatable with respect to the shaft portion 40j and the upper cup portion 44j.

Referring to FIG. 25, the shaft portion 40j is inserted in the through hole 230j of the base plate 21j. Specifically, the wall portion 452j of the shaft portion 40j is preferably inserted in the through hole 230j. Hereinafter, a portion of the wall portion 452j of the shaft portion 40j which is inserted in the through hole 230j will be referred to as a "wall portion lower portion 453j". An outer circumferential surface of the wall portion lower portion 453j is a cylindrical surface centered on the central axis J1. Hereinafter, the outer circumferential surface of the wall portion lower portion 453j will be referred to as an "inserted outer circumferential surface 454j".

In addition, a portion of the base plate 21j which is in the vicinity of the central axis J1 and which includes the through hole 230j will be hereinafter referred to as an "inner circumferential portion 23j". A portion of an inner circumferential surface of the inner circumferential portion 23j will be referred to as an "inner circumferential surface upper portion 231j", and another portion of the inner circumferential surface of the inner circumferential portion 23j will be referred to as an "inner circumferential surface lower portion 232j". The inner circumferential surface upper portion 231j is a cylindrical surface centered on the central axis J1. The inner circumferential surface lower portion 232j is preferably an inclined surface which gradually decreases in diameter with increasing height, and is located below the inner circumferential surface upper portion 231j.

A fixing region 8j is defined between the inner circumferential portion 23j of the base plate 21j, which defines the through hole 230j, and the inserted outer circumferential surface 454j, which is an outer circumferential portion of the bearing mechanism 4j. In other words, the fixing region 8j is defined between the inner circumferential portion 23j of the base plate 21j and an outer circumferential portion of the wall portion 452j of the shaft portion 40j. The fixing region 8j preferably includes a first region 81j and a second region 82j.

The first region 81j is defined between the inner circumferential surface upper portion 231j of the inner circumferential portion 23j and the inserted outer circumferential surface 454j of the wall portion lower portion 453j. At the first region 81j, the inner circumferential surface upper portion 231j, which is a portion of an inner circumferential surface of the base plate 21j, and the inserted outer circumferential surface 454j, which is a portion of an outer circumferential surface of the wall portion 452j, are preferably fixed to each other through, for example, insertion and adhesion. Accordingly, at the first region 81j, a first adhesive 71j is provided between the inner circumferential surface upper portion 231j and the inserted outer circumferential surface 454j. Note that, at the first region 81j, the inner circumferential portion 23j and the wall portion lower portion 453j may alternatively be fixed to each other by any other desirable method, such as, for example, simple press fitting or shrink fitting.

The second region 82j is located below the first region 81j, and is defined between the inner circumferential surface lower portion 232j of the inner circumferential portion 23j and the inserted outer circumferential surface 454j of the wall portion 452j. At the second region 82j, a seal gap 821j is defined between the inner circumferential portion 23j and an outer circumferential portion of the wall portion lower portion 453j. A radial width of the seal gap 821j gradually decreases with increasing height. In addition, in the seal gap 821j at the second region 82j, a second adhesive 72j is preferably provided between the inner circumferential surface lower portion 232j and the inserted outer circumferential surface 454j.

In the seal gap 821j, the second adhesive 72j is provided over an entire circumferential extent thereof. Thus, a gap between the shaft portion 40j and the inner circumferential portion 23j of the base plate 21j is sealed in the seal gap 821j. This reduces the likelihood that a gas will leak out of the housing through the gap between the shaft portion 40j and the inner circumferential portion 23j.

Here, the second adhesive 72j preferably has a glass transition temperature lower than a glass transition temperature of the first adhesive 71j. That is, the first adhesive 71j, which has a high glass transition temperature and a high joining strength, is used in the first region 81j. This leads to an improvement in the strength with which the inner circumferential portion 23j and the inserted outer circumferential surface 454j of the wall portion lower portion 453j are fixed to each other. Meanwhile, the second adhesive 72j, which is used in the second region 82j, preferably has a low glass transition temperature and is flexible, is highly resistant to a heat shock, and has a high sealing capability. In the motor 12j, the second adhesive 72j as described above is provided over the entire circumferential extent of the seal gap 821j, and the gap between the shaft portion 40j and the inner circumferential portion 23j is thus more securely sealed. This further reduces the likelihood that the gas will leak out of the housing through the gap between the shaft portion 40j and the inner circumferential portion 23j of the base plate 21j. Note that the same type of adhesive may be used as both the first adhesive 71j and the second adhesive 72j.

In addition, in the motor 12j, the fixing region 8j preferably includes a lower tapered gap 83j located below the second region 82j, and an upper tapered gap 84j located above the first region 81j. The upper tapered gap 84j gradually increases in radial width with increasing height. This allows the first adhesive 71j provided in the first region 81j to be attracted downward in the upper tapered gap 84j and to be prevented from leaking upwardly of the upper tapered gap 84j before the first adhesive 71j is cured.

Meanwhile, the lower tapered gap 83j gradually increases in radial width with decreasing height. This allows the second adhesive 72j provided in the second region 82j to be attracted upward in the lower tapered gap 83j and to be prevented from leaking downwardly of the lower tapered gap 83j before the second adhesive 72j is cured. As a result, the second adhesive 72j is prevented from spreading to a lower surface of the base plate 21j.

When the motor 12j is assembled, the shaft portion 40j and the base plate 21j are first press fitted and adhered to each other. Thereafter, with the shaft portion 40j and the base plate 21j turned upside down, the second adhesive 72j is applied to the seal gap 821j for additional adhesion. In other words, the second adhesive 72j, which is now in a liquid state before being cured, is applied to at least one location in the lower tapered gap 83j. As a result, the second adhesive 72j enters into the seal gap 821j, and spreads in the seal gap 821j evenly in the circumferential direction.

An opening angle of the lower tapered gap 83j is greater than an opening angle of the seal gap 821j. This allows the second adhesive 72j, which is applied to the lower tapered gap 83j for the additional adhesion, to be easily drawn from the lower tapered gap 83j into the seal gap 821j by capillary action. This contributes to more securely sealing the seal gap 821j with the second adhesive 72j. This in turn contributes to further reducing the likelihood that the gas will leak out of the housing through the gap between the shaft portion 40j and the inner circumferential portion 23j of the base plate 21j.

In addition, in the motor 12j, the lower tapered gap 83j preferably has a volume greater than a volume of the upper tapered gap 84j. This enables a greater amount of second adhesive 72j to be temporarily held in the lower tapered gap 83j when the second adhesive 72j is applied for the additional adhesion. This contributes to more securely sealing the seal gap 821j with the second adhesive 72j. This further reduces the likelihood that the gas will leak out of the housing through the gap between the shaft portion 40j and the inner circumferential portion 23j of the base plate 21j.

In addition, in the motor 12j, the inner circumferential portion 23j of the base plate 21j preferably has, at least in the second region 82j, a degree of surface roughness greater than a degree of surface roughness of the inserted outer circumferential surface 454j of the shaft portion 40j. In other words, a degree of surface roughness of the inner circumferential surface lower portion 232j, which defines the seal gap 821j, is greater than the degree of surface roughness of the inserted outer circumferential surface 454j of the wall portion 452j. Thus, the second adhesive 72j provided in the second region 82j is less likely to leak toward the base plate 21j, which has a greater degree of surface roughness, than toward the shaft portion 40j, which has a smaller degree of surface roughness.

Further, in the motor 12j, a lower chamfered surface 832j of the base plate 21j, which defines the lower tapered gap 83j, preferably has a degree of surface roughness greater than the degree of surface roughness of the inserted outer circumferential surface 454j. Thus, when the second adhesive 72j has a volume greater than a volume of the seal gap 821j, and the second adhesive 72j is provided in the lower tapered gap 83j as well, the second adhesive 72j provided in the lower tapered gap 83j is less likely to leak toward the base plate 21j, which preferably has a greater degree of surface roughness, than toward the shaft portion 40j, which has a smaller degree of surface roughness.

Thus, the second adhesive 72j, which has been applied into the seal gap 821j for the additional adhesion, is prevented from spreading to the lower surface of the base plate 21j.

Referring to FIG. 25, in the motor 12j, a lower axial end surface of the wall portion 452j of the shaft portion 40j is located at an axial level higher than an axial level of a lower axial end surface of the base plate 21j. As a result, the second adhesive 72j is more effectively prevented from spreading to the lower surface of the base plate 21j. Meanwhile, in the motor 12j, the second adhesive 72j preferably has a volume smaller than a sum of the volume of the seal gap 821j and a volume of the lower tapered gap 83j. Accordingly, a lower surface of the second adhesive 72j is defined at an axial level higher than an axial level of the lower axial end surface of the wall portion 452j.

In the motor 12j, the lower surface of the second adhesive 72j is defined at a level higher than both that of the lower axial end surface of the wall portion 452j of the shaft portion 40j and that of the lower axial end surface of the base plate 21j as described above. Thus, the second adhesive 72j is more effectively prevented from spreading to the lower surface of the base plate 21j.

Figure 26:
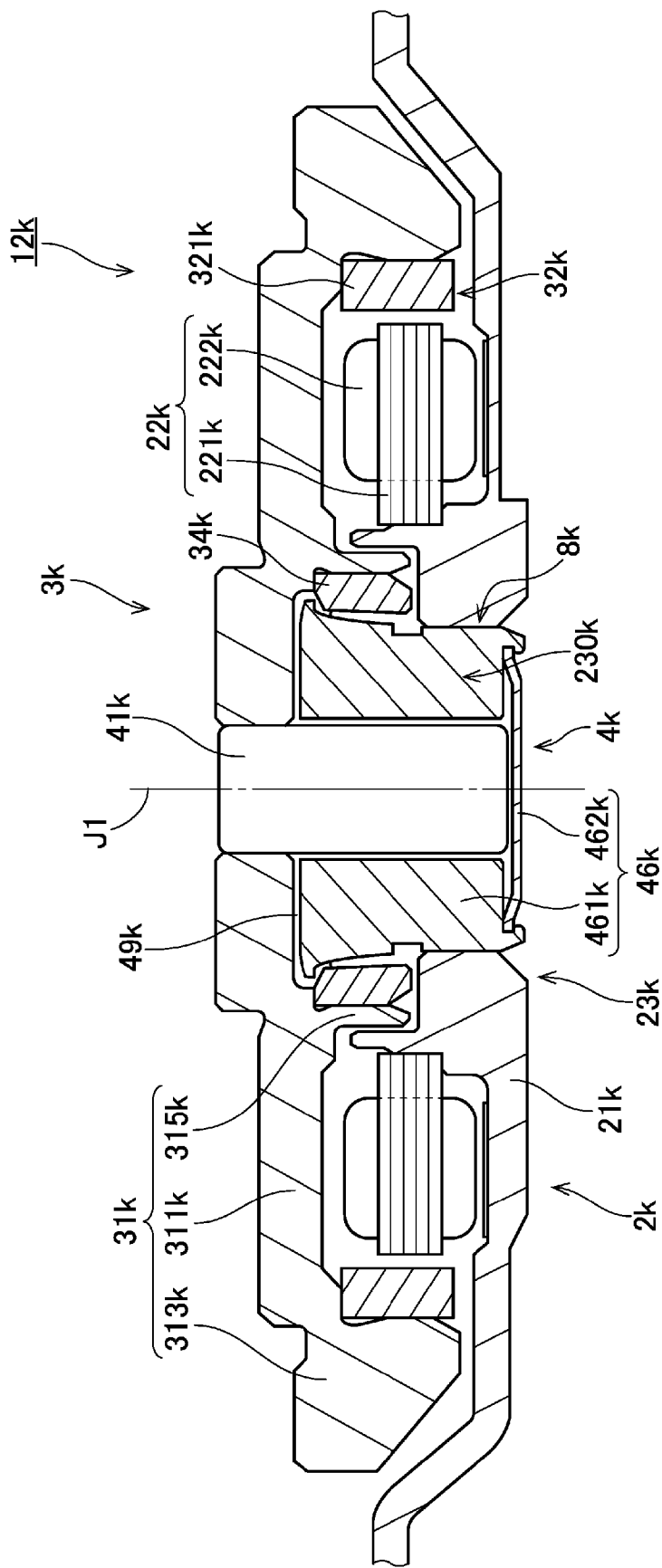
FIG. 26 is a vertical cross-sectional view of a motor according to a ninth preferred embodiment of the present invention.
Figure 27:
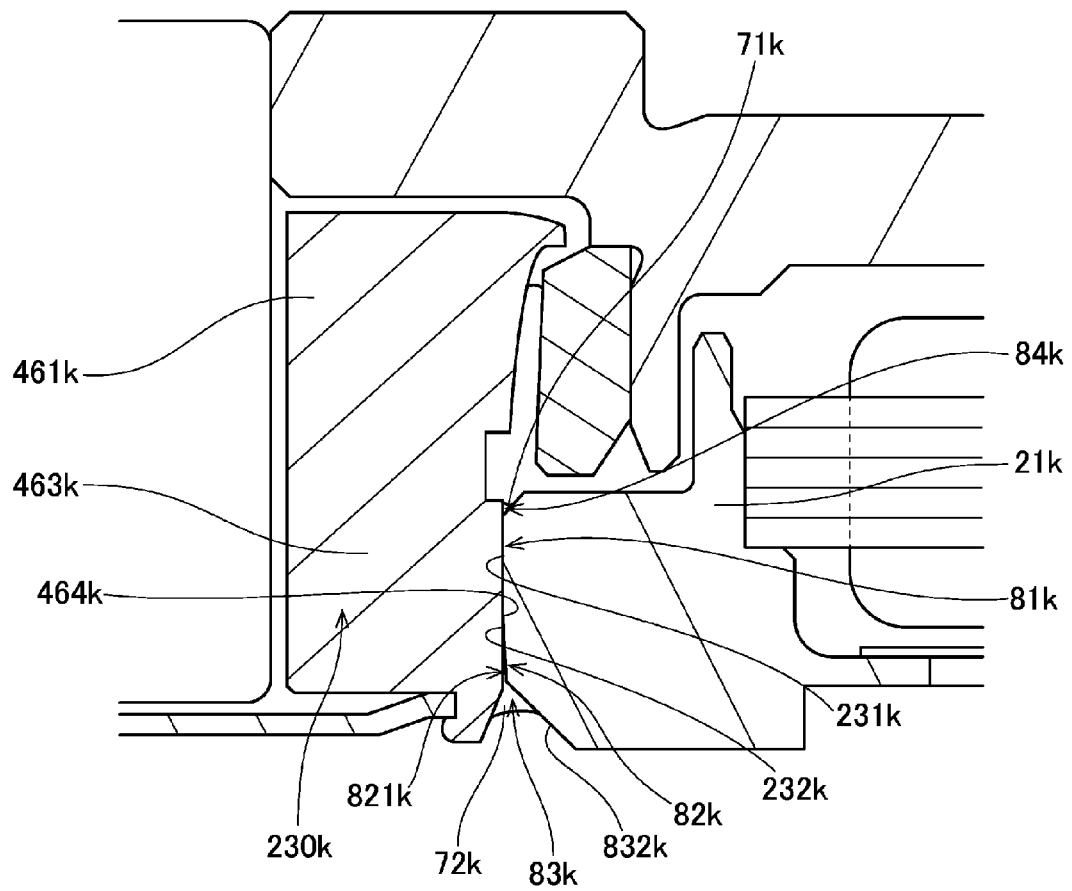
FIG. 27 is a diagram illustrating a lower portion of a bearing mechanism of the motor and its vicinity according to the ninth preferred embodiment of the present invention.

FIG. 26 is a vertical cross-sectional view of a motor 12k according to a ninth preferred embodiment of the present invention. FIG. 27 is a diagram illustrating a lower portion of a bearing mechanism 4k of the motor 12k and its vicinity. The motor 12k is preferably an outer-rotor motor. The motor 12k includes a stationary portion 2k, a rotating portion 3k, and the bearing mechanism 4k. The rotating portion 3k is supported through the bearing mechanism 4k to be rotatable about a central axis J1 of the motor 12k with respect to the stationary portion 2k. The central axis J1 of the motor 12k is a central axis of each of the stationary portion 2k, the rotating portion 3k, and the bearing mechanism 4k as well.

The stationary portion 2k includes a base plate 21k, which is an exemplary base portion, and a stator 22k. The base plate 21k defines a portion of a housing of a disk drive apparatus which includes the motor 12k. A through hole 230k passing through the base plate 21k in the axial direction is defined in a center of the base plate 21k. Here, a portion of the base plate 21k which is in the vicinity of the central axis J1 and which includes the through hole 230k will be hereinafter referred to as an "inner circumferential portion 23k". The stator 22k includes a stator core 221k and coils 222k wound around the stator core 221k.

The rotating portion 3k preferably includes a rotor hub 31k, a magnetic member 32k, and an annular member 34k. The rotor hub 31k includes a hub body 311k, a disk mount portion 313k, and an annular projecting portion 315k.

The hub body 311k is an annular portion extending in a plate shape. The disk mount portion 313k extends radially outward and downward from an outer edge portion of the hub body 311k. An inner circumferential surface of the disk mount portion 313k is cylindrical, and a rotor magnet 321k, which will be described below, is fixed to the inner circumferential surface of the disk mount portion 313k. The annular projecting portion 315k is a cylindrical or substantially cylindrical portion projecting downward from a lower surface of the hub body 311k.

The magnetic member 32k includes the rotor magnet 321k, which is cylindrical or substantially cylindrical. The rotor magnet 321k is fixed to the inner circumferential surface of the disk mount portion 313k. The rotor magnet 321k is positioned radially opposite to the stator 22k. A torque is produced between the stator 22k and the rotor magnet 321k.

The annular member 34k is an annular or substantially annular member fixed to an inner circumferential surface of the annular projecting portion 315k of the rotor hub 31k. An inner circumferential surface of the annular member 34k is positioned radially opposite to an outer circumferential surface of a sleeve 461k, which will be described below.

The bearing mechanism 4k preferably includes a shaft 41k and a stationary bearing portion 46k. The shaft 41k is a columnar member extending along the central axis J1. An upper portion of the shaft 41k is fixed to an inner end portion of the hub body 311k of the rotor hub 31k. The shaft 41k is thus configured to rotate together with the rotating portion 3k with respect to the stationary portion 2k.

The stationary bearing portion 46k preferably includes the sleeve 461k and a cap 462k. The sleeve 461k extends in the axial direction to assume or substantially assume a cylindrical shape around the shaft 41k. A lower portion of the sleeve 461k is accommodated radially inside the inner circumferential portion 23k of the base plate 21k. Note that an inner circumferential surface of the base plate 21k and the outer circumferential surface of the sleeve 461k are preferably fixed to each other through insertion and adhesion. An inner circumferential surface of the sleeve 461k is positioned radially opposite to an outer circumferential surface of the shaft 41k. In addition, the cap 462k is configured to close a lower opening of the sleeve 461k. In the motor 12k, the sleeve 461k defines a sleeve portion.

A lubricating oil 49k is provided in a minute gap between the stationary bearing portion 46k and a combination of the shaft 41k, the hub body 311k of the rotor hub 31k, and the annular member 34k. A surface of the lubricating oil 49k is preferably defined between the sleeve 461k and the annular member 34k. The shaft 41k, the rotor hub 31k, and the annular member 34k are thus supported through the lubricating oil 49k to be rotatable with respect to the stationary bearing portion 46k.

Referring to FIG. 27, the lower portion of the sleeve 461k is inserted in the through hole 230k of the base plate 21k. Hereinafter, a portion of the sleeve 461k which is inserted in the through hole 230k will be referred to as a "sleeve lower portion 463k". An outer circumferential surface of the sleeve lower portion 463k is a cylindrical surface centered on the central axis J1. Hereinafter, the outer circumferential surface of the sleeve lower portion 463k will be referred to as an "inserted outer circumferential surface 464k".

In addition, a portion of an inner circumferential surface of the inner circumferential portion 23k of the base plate 21k will be referred to as an "inner circumferential surface upper portion 231k", and another portion of the inner circumferential surface of the inner circumferential portion 23k of the base plate 21k will be referred to as an "inner circumferential surface lower portion 232k". The inner circumferential surface upper portion 231k is a cylindrical surface centered on the central axis J1. The inner circumferential surface lower portion 232k is an inclined surface which gradually decreases in diameter with increasing height, and is located below the inner circumferential surface upper portion 231k.

A fixing region 8k is defined between the inner circumferential portion 23k of the base plate 21k, which defines the through hole 230k, and the inserted outer circumferential surface 464k, which is an outer circumferential portion of the bearing mechanism 4k. In other words, the fixing region 8k is defined between the inner circumferential portion 23k of the base plate 21k and an outer circumferential portion of the sleeve 461k. The fixing region 8k preferably includes a first region 81k and a second region 82k.

The first region 81k is defined between the inner circumferential surface upper portion 231k of the inner circumferential portion 23k and the inserted outer circumferential surface 464k of the sleeve 461k. At the first region 81k, the inner circumferential surface upper portion 231k, which is a portion of the inner circumferential surface of the base plate 21k, and the inserted outer circumferential surface 464k, which is a portion of the outer circumferential surface of the sleeve 461k, are preferably fixed to each other through, for example, insertion and adhesion. Accordingly, at the first region 81k, a first adhesive 71k is preferably provided between the inner circumferential surface upper portion 231k and the inserted outer circumferential surface 464k. Note that, at the first region 81k, the inner circumferential portion 23k and the outer circumferential portion of the sleeve 461k may alternatively be fixed to each other by any other desirable method, such as, for example, simple press fitting or shrink fitting.

The second region 82k is located below the first region 81k, and is defined between the inner circumferential surface lower portion 232k of the inner circumferential portion 23k and the inserted outer circumferential surface 464k of the sleeve 461k. At the second region 82k, a seal gap 821k is preferably defined between the inner circumferential portion 23k and an outer circumferential portion of the sleeve lower portion 463k. A radial width of the seal gap 821k gradually decreases with increasing height. In addition, in the seal gap 821k at the second region 82k, a second adhesive 72k is provided between the inner circumferential surface lower portion 232k and the inserted outer circumferential surface 464k.

In the seal gap 821k, the second adhesive 72k is provided over an entire circumferential extent thereof. Thus, a gap between the sleeve 461k and the inner circumferential portion 23k of the base plate 21k is sealed in the seal gap 821k. This reduces the likelihood that a gas will leak out of the housing through the gap between the sleeve 461k and the inner circumferential portion 23k.

Here, the second adhesive 72k preferably has a glass transition temperature lower than a glass transition temperature of the first adhesive 71k. That is, the first adhesive 71k, which has a high glass transition temperature and a high joining strength, is used in the first region 81k. This leads to an improvement in the strength with which the inner circumferential portion 23k and the inserted outer circumferential surface 464k of the sleeve 461k are fixed to each other. Meanwhile, the second adhesive 72k, which is used in the second region 82k, preferably has a low glass transition temperature and is flexible, is highly resistant to a heat shock, and has a high sealing capability. In the motor 12k, the second adhesive 72k as described above is provided over the entire circumferential extent of the seal gap 821k, and the gap between the sleeve 461k and the inner circumferential portion 23k is thus more securely sealed. This further reduces the likelihood that the gas will leak out of the housing through the gap between the sleeve 461k and the inner circumferential portion 23k of the base plate 21k. Note that the same type of adhesive may be used as both the first adhesive 71k and the second adhesive 72k.

In addition, in the motor 12k, the fixing region 8k preferably includes a lower tapered gap 83k located below the second region 82k, and an upper tapered gap 84k located above the first region 81k. The upper tapered gap 84k gradually increases in radial width with increasing height. This allows the first adhesive 71k provided in the first region 81k to be attracted downward in the upper tapered gap 84k and to be prevented from leaking upwardly of the upper tapered gap 84k before the first adhesive 71k is cured.

Meanwhile, the lower tapered gap 83k gradually increases in radial width with decreasing height. This allows the second adhesive 72k provided in the second region 82k to be attracted upward in the lower tapered gap 83k and to be prevented from leaking downwardly of the lower tapered gap 83k before the second adhesive 72k is cured. As a result, the second adhesive 72k is preferably prevented from spreading to a lower surface of the base plate 21k.

When the motor 12k is assembled, the stationary bearing portion 46k is first inserted in the base plate 21k, and the stationary bearing portion 46k and the base plate 21k are fixed to each other through adhesion. Thereafter, with the stationary bearing portion 46k and the base plate 21k turned upside down, the second adhesive 72k is applied to the seal gap 821k for additional adhesion. In other words, the second adhesive 72k, which is now in a liquid state before being cured, is applied to at least one location in the lower tapered gap 83k. As a result, the second adhesive 72k enters into the seal gap 821k, and spreads in the seal gap 821k evenly in the circumferential direction.

An opening angle of the lower tapered gap 83k is preferably greater than an opening angle of the seal gap 821k. This allows the second adhesive 72k, which is applied to the lower tapered gap 83k for the additional adhesion, to be easily drawn from the lower tapered gap 83k into the seal gap 821k by capillary action. This contributes to more securely sealing the seal gap 821k with the second adhesive 72k. This in turn contributes to further reducing the likelihood that the gas will leak out of the housing through the gap between the sleeve 461k and the inner circumferential portion 23k of the base plate 21k.

In addition, in the motor 12k, the lower tapered gap 83k has a volume greater than a volume of the upper tapered gap 84k. This enables a greater amount of second adhesive 72k to be temporarily held in the lower tapered gap 83k when the second adhesive 72k is applied for the additional adhesion. This contributes to more securely sealing the seal gap 821k with the second adhesive 72k. This further reduces the likelihood that the gas will leak out of the housing through the gap between the sleeve 461k and the inner circumferential portion 23k of the base plate 21k.

In addition, in the motor 12k, the inner circumferential portion 23k of the base plate 21k has, at least in the second region 82k, a degree of surface roughness greater than a degree of surface roughness of the inserted outer circumferential surface 464k of the sleeve 461k. In other words, a degree of surface roughness of the inner circumferential surface lower portion 232k, which defines the seal gap 821k, is greater than the degree of surface roughness of the inserted outer circumferential surface 464k of the sleeve 461k. Thus, the second adhesive 72k provided in the second region 82k is less likely to leak toward the base plate 21k, which has a greater degree of surface roughness, than toward the sleeve 461k, which has a smaller degree of surface roughness.

Further, in the motor 12k, a lower chamfered surface 832k of the base plate 21k, which defines the lower tapered gap 83k, preferably has a degree of surface roughness greater than the degree of surface roughness of the inserted outer circumferential surface 464k. Thus, when the second adhesive 72k has a volume greater than a volume of the seal gap 821k, and the second adhesive 72k is provided in the lower tapered gap 83k as well, the second adhesive 72k provided in the lower tapered gap 83k is less likely to leak toward the base plate 21k, which has a greater degree of surface roughness, than toward the sleeve 461k, which has a smaller degree of surface roughness.

Thus, the second adhesive 72k, which has been applied into the seal gap 821k for the additional adhesion, is prevented from spreading to the lower surface of the base plate 21k.

Referring to FIG. 27, in the motor 12k, a lower axial end surface of the sleeve 461k is located at an axial level higher than an axial level of a lower axial end surface of the base plate 21k. As a result, the second adhesive 72k is more effectively prevented from spreading to the lower surface of the base plate 21k. Meanwhile, in the motor 12k, the second adhesive 72k preferably has a volume smaller than a sum of the volume of the seal gap 821k and a volume of the lower tapered gap 83k. Accordingly, a lower surface of the second adhesive 72k is defined at an axial level higher than an axial level of the lower axial end surface of the sleeve 461k.

In the motor 12k, the lower surface of the second adhesive 72k is defined at a level higher than both that of the lower axial end surface of the sleeve 461k and that of the lower axial end surface of the base plate 21k as described above. Thus, the second adhesive 72k is more effectively prevented from spreading to the lower surface of the base plate 21k.

Figure 28:
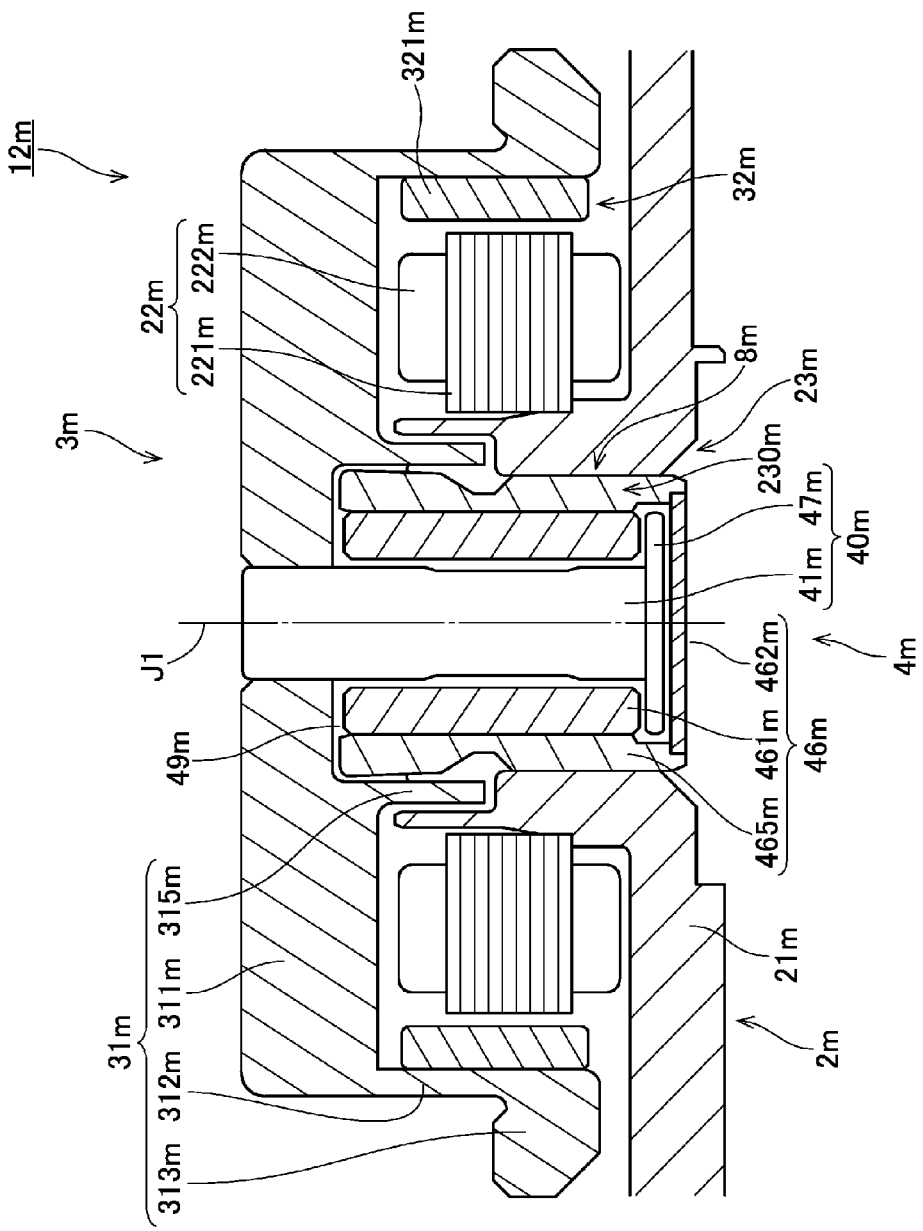
FIG. 28 is a vertical cross-sectional view of a motor according to a tenth preferred embodiment of the present invention.
Figure 29:
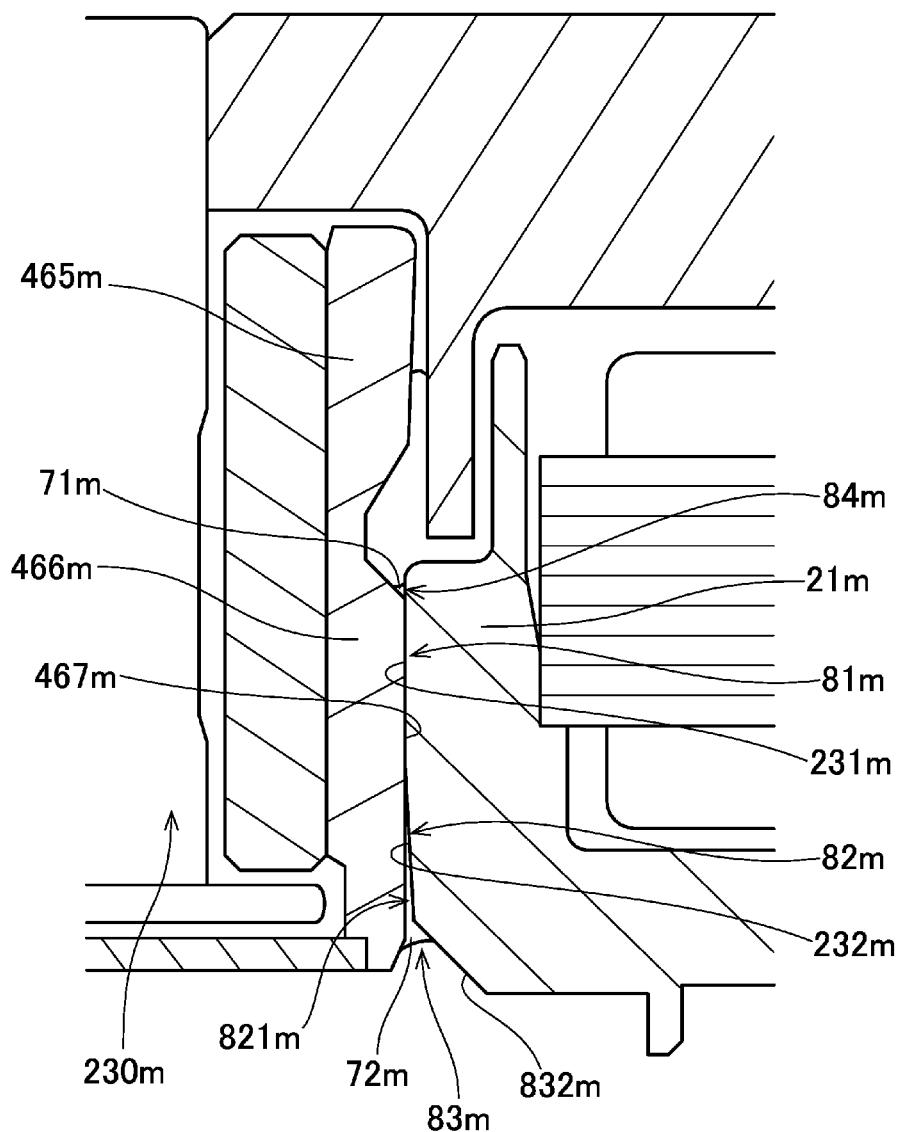
FIG. 29 is a diagram illustrating a lower portion of a bearing mechanism of the motor and its vicinity according to the tenth preferred embodiment of the present invention.

FIG. 28 is a vertical cross-sectional view of a motor 12m according to a tenth preferred embodiment of the present invention. FIG. 29 is a diagram illustrating a lower portion of a bearing mechanism 4m of the motor 12m and its vicinity. The motor 12m is an outer-rotor motor. The motor 12m includes a stationary portion 2m, a rotating portion 3m, and the bearing mechanism 4m. The rotating portion 3m is supported through the bearing mechanism 4m to be rotatable about a central axis J1 of the motor 12m with respect to the stationary portion 2m. The central axis J1 of the motor 12m is a central axis of each of the stationary portion 2m, the rotating portion 3m, and the bearing mechanism 4m as well.

The stationary portion 2m includes a base plate 21m, which is an exemplary base portion, and a stator 22m. The base plate 21m defines a portion of a housing of a disk drive apparatus which includes the motor 12m. A through hole 230m passing through the base plate 21m in the axial direction is defined in a center of the base plate 21m. Here, a portion of the base plate 21m which is in the vicinity of the central axis J1 and which includes the through hole 230m will be hereinafter referred to as an "inner circumferential portion 23m". The stator 22m includes a stator core 221m and coils 222m wound around the stator core 221m.

The rotating portion 3m includes a rotor hub 31m and a magnetic member 32m. The rotor hub 31m preferably includes a hub body 311m, a cylindrical portion 312m, a disk mount portion 313m, and an annular projecting portion 315m.

The hub body 311m is an annular portion extending in a plate shape. The cylindrical portion 312m projects downward from an outer edge portion of the hub body 311m. The disk mount portion 313m extends radially outward from a lower portion of the cylindrical portion 312m. The annular projecting portion 315m is a cylindrical or substantially cylindrical portion projecting downward from a lower surface of the hub body 311m.

The magnetic member 32m includes a rotor magnet 321m, which is cylindrical or substantially cylindrical. The rotor magnet 321m is fixed to an inner circumferential surface of the cylindrical portion 312m. The rotor magnet 321m is positioned radially opposite to the stator 22m. A torque is produced between the stator 22m and the rotor magnet 321m.

The bearing mechanism 4m preferably includes a shaft portion 40m and a stationary bearing portion 46m. The shaft portion 40m includes a shaft 41m and a shaft plate portion 47m. The shaft 41m is a columnar member extending along the central axis J1. An upper portion of the shaft 41m is fixed to an inner end portion of the hub body 311m of the rotor hub 31m.

The shaft plate portion 47m is a disk-shaped member extending radially. An upper surface of the shaft plate portion 47m is preferably fixed to a lower axial end portion of the shaft 41m. The shaft plate portion 47m extends radially outward beyond an outer circumferential portion of the shaft 41m. In addition, the upper surface of the shaft plate portion 47m is arranged opposite to a lower surface of a sleeve 461m, which will be described below. In the motor 12m, the shaft 41m and the shaft plate portion 47m are preferably defined by separate members. Note, however, that the shaft 41m and the shaft plate portion 47m may alternatively be defined by a single continuous monolithic member.

Since the shaft portion 40m is fixed to the rotor hub 31m as mentioned above, the shaft portion 40m is configured to rotate together with the rotating portion 3m with respect to the stationary portion 2m.

The stationary bearing portion 46m preferably includes the sleeve 461m, a cap 462m, and a sleeve housing 465m. The sleeve 461m extends in the axial direction to substantially assume a cylindrical shape around the shaft 41m. The sleeve 461m is preferably a sleeve body extending in the axial direction, and including a hole through which the shaft 41m is inserted. The lower surface of the sleeve 461m is arranged opposite to the upper surface of the shaft plate portion 47m with a slight gap intervening therebetween.

The sleeve housing 465m is a cylindrical or substantially cylindrical member, and is configured to cover at least a lower portion of an outer circumferential surface of the sleeve 461m. The sleeve 461m is fixed to an inside of the substantially cylindrical sleeve housing 465m. A lower axial end portion of the sleeve housing 465m is located at an axial level lower than an axial level of a lower axial end portion of the sleeve 461m. In addition, an upper portion of the sleeve housing 465m is preferably accommodated radially inside the annular projecting portion 315m of the rotor hub 31m.

The cap 462m is configured to close a lower opening of the sleeve housing 465m. In the motor 12m, the sleeve 461m and the sleeve housing 465m together define a sleeve portion.

A lubricating oil 49m is provided in a minute gap between the stationary bearing portion 46m and a combination of the shaft portion 40m and the rotor hub 31m. A surface of the lubricating oil 49m is preferably defined between an outer circumferential surface of the sleeve housing 465m and the annular projecting portion 315m of the rotor hub 31m. The shaft portion 40m and the rotor hub 31m are thus supported through the lubricating oil 49m to be rotatable with respect to the stationary bearing portion 46m.

Referring to FIG. 29, a lower portion of the sleeve housing 465m is inserted in the through hole 230m of the base plate 21m. Hereinafter, a portion of the sleeve housing 465m which is inserted in the through hole 230m will be referred to as a "housing lower portion 466m". An outer circumferential surface of the housing lower portion 466m is a cylindrical surface centered on the central axis J1. Hereinafter, the outer circumferential surface of the housing lower portion 466m will be referred to as an "inserted outer circumferential surface 467m".

In addition, a portion of an inner circumferential surface of the inner circumferential portion 23m of the base plate 21m will be referred to as an "inner circumferential surface upper portion 231m", and another portion of the inner circumferential surface of the inner circumferential portion 23m of the base plate 21m will be referred to as an "inner circumferential surface lower portion 232m". The inner circumferential surface upper portion 231m is a cylindrical surface centered on the central axis J1. The inner circumferential surface lower portion 232m is an inclined surface which gradually decreases in diameter with increasing height, and is located below the inner circumferential surface upper portion 231m.

A fixing region 8m is defined between the inner circumferential portion 23m of the base plate 21m, which defines the through hole 230m, and the inserted outer circumferential surface 467m, which is an outer circumferential portion of the bearing mechanism 4m. In other words, the fixing region 8m is preferably defined between the inner circumferential portion 23m of the base plate 21m and an outer circumferential portion of the sleeve housing 465m. The fixing region 8m includes a first region 81m and a second region 82m.

The first region 81m is defined between the inner circumferential surface upper portion 231m of the inner circumferential portion 23m and the inserted outer circumferential surface 467m of the sleeve housing 465m. At the first region 81m, the inner circumferential surface upper portion 231m, which is a portion of an inner circumferential surface of the base plate 21m, and the inserted outer circumferential surface 467m, which is a portion of the outer circumferential surface of the sleeve housing 465m, are fixed to each other through insertion and adhesion. Accordingly, at the first region 81m, a first adhesive 71m is preferably provided between the inner circumferential surface upper portion 231m and the inserted outer circumferential surface 467m. Note that, at the first region 81m, the inner circumferential portion 23m and the outer circumferential portion of the sleeve housing 465m may alternatively be fixed to each other by any other desirable method, such as, for example, simple press fitting or shrink fitting.

The second region 82m is located below the first region 81m, and is defined between the inner circumferential surface lower portion 232m of the inner circumferential portion 23m and the inserted outer circumferential surface 467m of the sleeve housing 465m. At the second region 82m, a seal gap 821m is defined between the inner circumferential portion 23m and an outer circumferential portion of the housing lower portion 466m. A radial width of the seal gap 821m gradually decreases with increasing height. In addition, in the seal gap 821m at the second region 82m, a second adhesive 72m is provided between the inner circumferential surface lower portion 232m and the inserted outer circumferential surface 467m.

In the seal gap 821m, the second adhesive 72m is provided over an entire circumferential extent thereof. Thus, a gap between the sleeve housing 465m and the inner circumferential portion 23m of the base plate 21m is sealed in the seal gap 821m. This reduces the likelihood that a gas will leak out of the housing through the gap between the sleeve housing 465m and the inner circumferential portion 23m.

Here, the second adhesive 72m preferably has a glass transition temperature lower than a glass transition temperature of the first adhesive 71m. That is, the first adhesive 71m, which has a high glass transition temperature and a high joining strength, is used in the first region 81m. This leads to an improvement in strength with which the inner circumferential portion 23m and the inserted outer circumferential surface 467m of the sleeve housing 465m are fixed to each other. Meanwhile, the second adhesive 72m, which is used in the second region 82m, preferably has a low glass transition temperature and is flexible, is highly resistant to a heat shock, and has a high sealing capability. In the motor 12m, the second adhesive 72m as described above is provided over the entire circumferential extent of the seal gap 821m, and the gap between the sleeve housing 465m and the inner circumferential portion 23m is thus more securely sealed. This further reduces the likelihood that the gas will leak out of the housing through the gap between the sleeve housing 465m and the inner circumferential portion 23m of the base plate 21m. Note that the same type of adhesive may be used as both the first adhesive 71m and the second adhesive 72m.

In addition, in the motor 12m, the fixing region 8m includes a lower tapered gap 83m located below the second region 82m, and an upper tapered gap 84m located above the first region 81m. The upper tapered gap 84m gradually increases in radial width with increasing height. This allows the first adhesive 71m provided in the first region 81m to be attracted downward in the upper tapered gap 84m and to be prevented from leaking upwardly of the upper tapered gap 84m before the first adhesive 71m is cured.

Meanwhile, the lower tapered gap 83m gradually increases in radial width with decreasing height. This allows the second adhesive 72m provided in the second region 82m to be attracted upward in the lower tapered gap 83m and to be prevented from leaking downwardly of the lower tapered gap 83m before the second adhesive 72m is cured. As a result, the second adhesive 72m is prevented from spreading to a lower surface of the base plate 21m.

When the motor 12m is assembled, the stationary bearing portion 46m is first inserted in the base plate 21m, and the stationary bearing portion 46m and the base plate 21m are fixed to each other through adhesion. Thereafter, with the stationary bearing portion 46m and the base plate 21m turned upside down, the second adhesive 72m is applied to the seal gap 821m for additional adhesion. In other words, the second adhesive 72m, which is now in a liquid state before being cured, is applied to at least one location in the lower tapered gap 83m. As a result, the second adhesive 72m enters into the seal gap 821m, and spreads in the seal gap 821m evenly in the circumferential direction.

An opening angle of the lower tapered gap 83m is greater than an opening angle of the seal gap 821m. This allows the second adhesive 72m, which is applied to the lower tapered gap 83m for the additional adhesion, to be easily drawn from the lower tapered gap 83m into the seal gap 821m by capillary action. This contributes to more securely sealing the seal gap 821m with the second adhesive 72m. This in turn contributes to further reducing the likelihood that the gas will leak out of the housing through the gap between the sleeve housing 465m and the inner circumferential portion 23m of the base plate 21m.

In addition, in the motor 12m, the lower tapered gap 83m preferably has a volume greater than a volume of the upper tapered gap 84m. This enables a greater amount of second adhesive 72m to be temporarily held in the lower tapered gap 83m when the second adhesive 72m is applied for the additional adhesion. This contributes to more securely sealing the seal gap 821m with the second adhesive 72m. This further reduces the likelihood that the gas will leak out of the housing through the gap between the sleeve housing 465m and the inner circumferential portion 23m of the base plate 21m.

In addition, in the motor 12m, the inner circumferential portion 23m of the base plate 21m preferably has, at least in the second region 82m, a degree of surface roughness greater than a degree of surface roughness of the inserted outer circumferential surface 467m of the sleeve housing 465m. In other words, a degree of surface roughness of the inner circumferential surface lower portion 232m, which defines the seal gap 821m, is greater than the degree of surface roughness of the inserted outer circumferential surface 467m of the sleeve housing 465m. Thus, the second adhesive 72m provided in the second region 82m is less likely to leak toward the base plate 21m, which has a greater degree of surface roughness, than toward the sleeve housing 465m, which has a smaller degree of surface roughness.

Further, in the motor 12m, a lower chamfered surface 832m of the base plate 21m, which defines the lower tapered gap 83m, preferably has a degree of surface roughness greater than the degree of surface roughness of the inserted outer circumferential surface 467m. Thus, when the second adhesive 72m has a volume greater than a volume of the seal gap 821m, and the second adhesive 72m is provided in the lower tapered gap 83m as well, the second adhesive 72m provided in the lower tapered gap 83m is less likely to leak toward the base plate 21m, which has a greater degree of surface roughness, than toward the sleeve housing 465m, which has a smaller degree of surface roughness.

Thus, the second adhesive 72m, which has been applied into the seal gap 821m for the additional adhesion, is prevented from spreading to the lower surface of the base plate 21m.

Referring to FIG. 29, in the motor 12m, a lower axial end surface of the sleeve housing 465m is located at an axial level higher than an axial level of a lower axial end surface of the base plate 21m. As a result, the second adhesive 72m is more effectively prevented from spreading to the lower surface of the base plate 21m. Meanwhile, in the motor 12m, the second adhesive 72m has a volume smaller than a sum of the volume of the seal gap 821m and a volume of the lower tapered gap 83m. Accordingly, a lower surface of the second adhesive 72m is defined at an axial level higher than an axial level of the lower axial end surface of the sleeve housing 465m.

In the motor 12m, the lower surface of the second adhesive 72m is defined at an axial level higher than both an axial level of the lower axial end surface of the sleeve housing 465m and an axial level of the lower axial end surface of the base plate 21m as described above. Thus, the second adhesive 72m is more effectively prevented from spreading to the lower surface of the base plate 21m.

Figure 30:
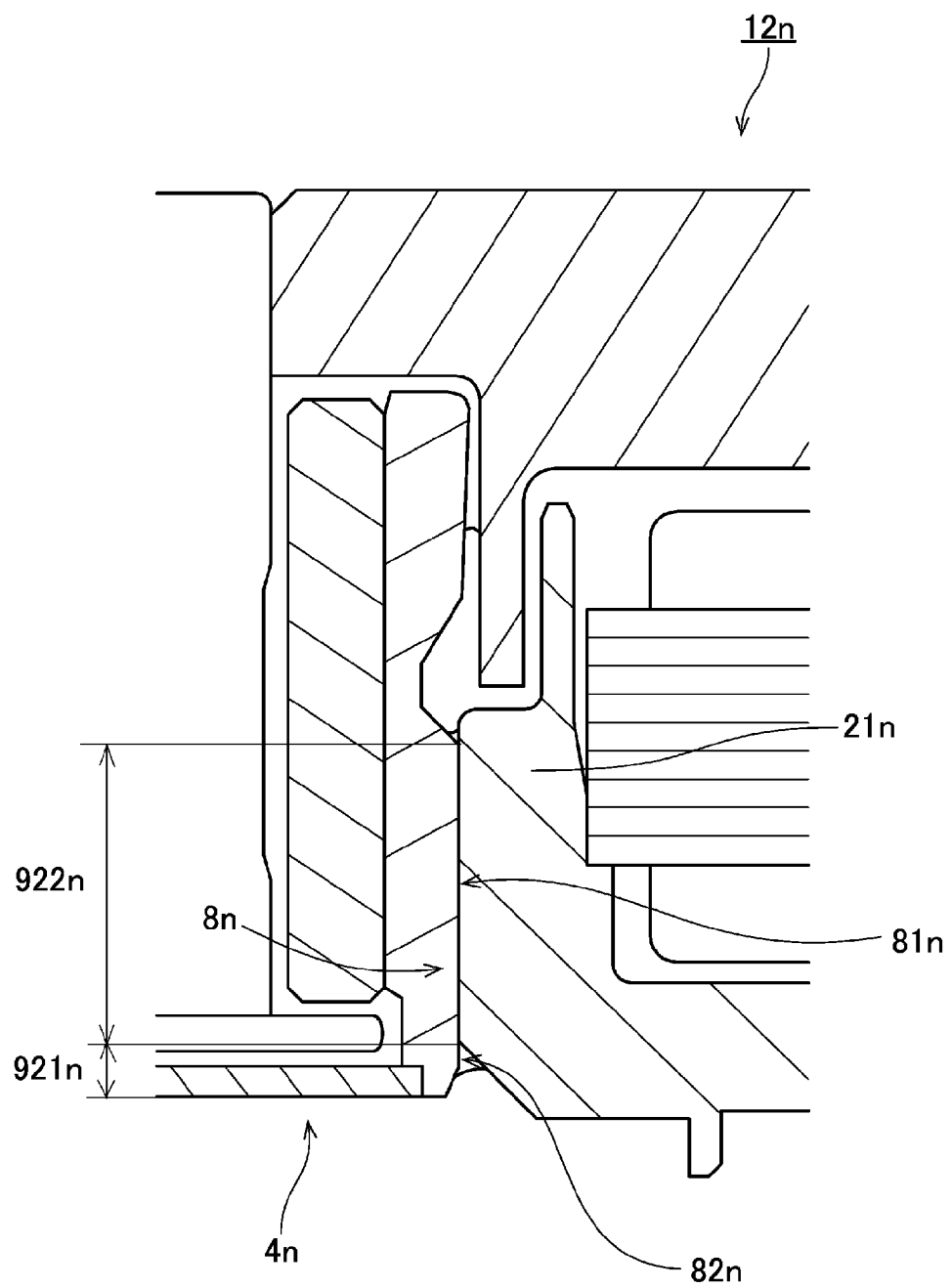
FIG. 30 is a diagram illustrating a lower portion of a bearing mechanism of a motor and its vicinity according to an eleventh preferred embodiment of the present invention.

FIG. 30 is a diagram illustrating a lower portion of a bearing mechanism 4n of a motor 12n and its vicinity according to an eleventh preferred embodiment of the present invention. The motor 12n is preferably equivalent to the motor 12m according to the tenth preferred embodiment except in the structure of a fixing region 8n and an adjacent area. Descriptions of features and characteristics of the motor 12n which are shared by the motor 12m according to the tenth preferred embodiment of the present invention will be omitted from the following description.

In the motor 12n, the fixing region 8n includes no lower tapered gap. Accordingly, a second region 82n is located at a lower axial end of the fixing region 8n. As described above, the fixing region may include no lower tapered gap.

In addition, in the motor 12n, an axial dimension 921n of the second region 82n is preferably about 0.2 times an axial dimension 922n of a first region 81n, for example. As described above, the axial dimension of the second region may not necessarily be in the range of about 0.5 times to about twice the axial dimension of the first region both inclusive, for example.

Of the motors according to the above-described preferred embodiments, only the motor according to the seventh preferred embodiment includes the sealing member configured to cover the lower opening of the through hole below the fixing region. Note, however, that a similar sealing member may be provided in any of the motors according to the other preferred embodiments and the modifications thereof.

Also note that features of the above-described preferred embodiments and the modifications thereof may be combined appropriately as long as no conflict arises. Also note that the detailed shape of any member of a motor according to a preferred embodiment of the present invention may be different from the shape thereof according to each of the above-described preferred embodiments and the modifications thereof.

Preferred embodiments of the present invention are applicable to spindle motors for use in disk drive apparatuses, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor for use in a disk drive apparatus, the spindle motor comprising:
a housing defining an interior space;
a bearing mechanism including a shaft portion extending in an axial direction;
a stationary portion including a base portion defining a portion of the housing; and
a rotating portion configured to rotate about a central axis with respect to the stationary portion through the bearing mechanism; wherein
the base portion includes a through hole in which the bearing mechanism is fitted;
a fixing region is located between an inner circumferential portion of the base portion which defines the through hole and an outer circumferential portion of the bearing mechanism;
the fixing region includes:
a first region at which the inner circumferential portion of the base portion and the outer circumferential portion of the bearing mechanism are fixed to each other; and
a second region located below the first region, and at which a seal gap is located between the inner circumferential portion of the base portion and the outer circumferential portion of the bearing mechanism;
the inner circumferential portion of the base portion has, at least in the second region, a degree of surface roughness greater than a degree of surface roughness of the outer circumferential portion of the bearing mechanism;
the seal gap gradually decreases in radial width with increasing height, and includes an adhesive along an entire circumference of the seal gap;
the shaft portion includes a columnar shaft extending along the central axis; and
the fixing region is located between the inner circumferential portion of the base portion and an outer circumferential portion of the shaft.

2. The spindle motor according to claim 1, wherein at the first region, an inner circumferential surface of the base portion and an outer circumferential surface of the shaft are fixed to each other.

3. The spindle motor according to claim 2, wherein a lower surface of the adhesive is located at an axial level higher than an axial level of a lower axial end surface of the base portion.

4. The spindle motor according to claim 2, wherein
a first adhesive is provided in the first region;
a second adhesive is provided in the second region; and
the second adhesive has a glass transition temperature lower than a glass transition temperature of the first adhesive.

5. The spindle motor according to claim 2, wherein the fixing region further includes:
an upper tapered gap located above the first region, and gradually increasing in radial width with increasing height; and
a lower tapered gap located below the second region, and gradually increasing in radial width with decreasing height;
an opening angle of the lower tapered gap is greater than an opening angle of the seal gap; and
the lower tapered gap has a volume greater than a volume of the upper tapered gap.

6. The spindle motor according to claim 2, wherein
a portion of the inner circumferential portion of the base portion which defines the seal gap is a cut surface; and
a portion of an outer circumferential portion of a lower portion of the shaft which defines the seal gap is a ground surface.

7. The spindle motor according to claim 1, wherein a lower surface of the adhesive is located at an axial level higher than an axial level of a lower axial end surface of the base portion.

8. The spindle motor according to claim 1, wherein
a first adhesive is provided in the first region;
a second adhesive is provided in the second region; and
the second adhesive has a glass transition temperature lower than a glass transition temperature of the first adhesive.

9. The spindle motor according to claim 1, wherein the shaft has a coefficient of linear expansion smaller than a coefficient of linear expansion of the base portion.

10. The spindle motor according to claim 1, wherein the adhesive has a coefficient of linear expansion greater than both a coefficient of linear expansion of the shaft and a coefficient of linear expansion of the base portion.

11. The spindle motor according to claim 1, wherein the fixing region further includes:
- an upper tapered gap located above the first region, and gradually increasing in radial width with increasing height; and
- a lower tapered gap located below the second region, and gradually increasing in radial width with decreasing height;
- an opening angle of the lower tapered gap is greater than an opening angle of the seal gap; and
- the lower tapered gap has a volume greater than a volume of the upper tapered gap.

12. The spindle motor according to claim 11, wherein an opening angle defined between the base portion and the shaft at the lower tapered gap is greater than an opening angle defined between the base portion and the shaft at the upper tapered gap.

13. The spindle motor according to claim 1, wherein a portion of the inner circumferential portion of the base portion which defines the first region has a degree of surface roughness smaller than a degree of surface roughness of a portion of the inner circumferential portion of the base portion which defines the second region.

14. The spindle motor according to claim 1, wherein
- a portion of the inner circumferential portion of the base portion which defines the seal gap is a cut surface; and
- a portion of an outer circumferential portion of a lower portion of the shaft which defines the seal gap is a ground surface.

15. The spindle motor according to claim 1, wherein the shaft includes a non-through hole portion extending downward from an upper axial end of the shaft along the central axis.

16. The spindle motor according to claim 1, wherein an axial dimension of the second region is in a range of about 0.5 times to about twice an axial dimension of the first region, both inclusive.

17. A spindle motor for use in a disk drive apparatus, the spindle motor comprising:
- a housing defining an interior space;
- a bearing mechanism including a shaft portion extending in an axial direction;
- a stationary portion including a base portion defining a portion of the housing; and
- a rotating portion configured to rotate about a central axis with respect to the stationary portion through the bearing mechanism; wherein
- the base portion includes a through hole in which the bearing mechanism is fitted;
- a fixing region is located between an inner circumferential portion of the base portion which defines the through hole and an outer circumferential portion of the bearing mechanism;
- the fixing region includes:
  - a first region at which the inner circumferential portion of the base portion and the outer circumferential portion of the bearing mechanism are fixed to each other; and
  - a second region located below the first region, and at which a seal gap is located between the inner circumferential portion of the base portion and the outer circumferential portion of the bearing mechanism;
- a recessed portion recessed radially inward at a lower axial end portion of the bearing mechanism or recessed radially outward from a lower axial end portion of a portion of the base portion which defines the through hole is provided, the recessed portion being joined to the seal gap, and extending all a way around the bearing mechanism;
- an adhesive is continuously provided in the recessed portion and the seal gap;
- in the seal gap, the adhesive is provided over an entire circumferential extent of the seal gap;
- a first adhesive is provided in the first region;
- a second adhesive is provided in the second region; and
- the second adhesive has a glass transition temperature lower than a glass transition temperature of the first adhesive.

18. The spindle motor according to claim 17, wherein at the first region, an inner circumferential surface of the base portion and the outer circumferential portion of the bearing mechanism are fixed to each other.

19. The spindle motor according to claim 18, wherein
- a first adhesive is provided in the first region;
- a second adhesive is provided in the second region; and
- the second adhesive has a glass transition temperature lower than a glass transition temperature of the first adhesive.

20. The spindle motor according to claim 18, wherein the recessed portion gradually increases in radial dimension with decreasing height.

21. The spindle motor according to claim 17, wherein an axial dimension of the second region is in a range of about 0.5 times to about twice an axial dimension of the first region both inclusive.

22. The spindle motor according to claim 17, wherein the fixing region further includes:
- an upper tapered gap located above the first region, and gradually increasing in radial width with increasing height; and
- a lower tapered gap located below the second region, and gradually increasing in radial width with decreasing height;
- an opening angle of the lower tapered gap is greater than an opening angle of the seal gap; and
- the lower tapered gap has a volume greater than a volume of the upper tapered gap.

23. The spindle motor according to claim 17, wherein the recessed portion gradually increases in radial dimension with decreasing height.

24. The spindle motor according to claim 17, wherein a lower surface of the adhesive is located at an axial level higher than an axial level of a lower axial end surface of the base portion.

* * * * *